(12) United States Patent
Smith, III

(10) Patent No.: US 6,772,139 B1
(45) Date of Patent: Aug. 3, 2004

(54) METHOD AND APPARATUS FOR FACILITATING USE OF HYPERTEXT LINKS ON THE WORLD WIDE WEB

(76) Inventor: Julius O. Smith, III, 4360 Miller Ave., Palo Alto, CA (US) 94306

( * ) Notice: Subject to any disclaimer, the term of this patent is extended or adjusted under 35 U.S.C. 154(b) by 0 days.

(21) Appl. No.: 09/412,248

(22) Filed: Oct. 5, 1999

Related U.S. Application Data

(60) Provisional application No. 60/103,089, filed on Oct. 5, 1998.

(51) Int. Cl.[7] .............................................. G06F 17/30
(52) U.S. Cl. ................................ 707/3; 707/1; 707/10; 707/100; 707/101; 707/102
(58) Field of Search ................................ 707/1, 2, 3, 4, 707/5, 7, 100, 10, 101, 102, 203, 103 R, 200, 201; 345/44, 336, 733, 744, 764, 804, 853, 854; 709/219, 226, 229; 715/501.1, 512

(56) References Cited

U.S. PATENT DOCUMENTS

| | | | | |
|---|---|---|---|---|
| 4,982,344 | A | | 1/1991 | Jordan ......................... 364/521 |
| 5,204,947 | A | | 4/1993 | Bernstein et al. ........... 359/157 |
| 5,297,249 | A | | 3/1994 | Bernstein et al. ........... 395/156 |
| 5,760,771 | A | * | 6/1998 | Blonder et al. .............. 345/854 |
| 5,794,257 | A | | 8/1998 | Liu et al. ..................... 707/501 |
| 5,806,079 | A | * | 9/1998 | Rivette et al. ............... 715/512 |
| 5,974,407 | A | * | 10/1999 | Sacks ............................. 707/2 |
| 6,285,999 | B1 | * | 9/2001 | Page ............................. 707/5 |

OTHER PUBLICATIONS

Carr.,L., D. De Roure, W. Hall, and G. Hill, "The Distributed Link Service: A Tool for Publishers, Authors and Readers." In The Web Revolution: Fourth International World Wide Web Conference; Dec. 11–15, 1995.

Carr.,L., D. De Roure, W. Hall, and G. Hill, " Application–Independent Link Processing." In The Web Revolution: Fourth International World wide Web Conference; May, 1998.

Carr.,L., D. De Roure, W. Hall, and G. Hill, " Implementing an Open Link service for the World–Wede Web" pp. 61–71, vol. 1, In The Web Revolution: Fourth International World Wide Web Conference; Dec. 11–15, 1995.

Davis, H., W. Hall, I. Heath, G. Hill, and R. Wilkins, "Towards an Integrated Information Environment with Open Hypermedia Systems." Proceedings of Hypertext–92, pp. 181–190, 1992.

Hall, W., G. Hill, and H. Davis; "Microcosm Link Service" Proceeding of Hypertext–93; Nov. 1993.

Hitchcock, S., "Open Journal Project: Final Report to eLib." Tech. Rept. Multimedia Research Group, University of Southampton, Nov. 1998.

Hitchcock, S., L. Carr, S. Harris, J. Hey, and W. Hall; "Citation Linking: Improving Access to Online Journals. Proceedings of Second ACM Conference on Digital Libraries, Philadelphia" pp. 115–122, 1997; New York: New York: Associatioan for Computing Machinery.

Hithcock, S., F. Quek, L. Carr, W. Hall, A. Witbrock, and I. Tarr. "Linking Everything to Everything: Journal Publishing Myth or Reality." In Proceedings of the ICCC/IFIP Conference on Electronic Publishing 97: New Models and Opportunities. Electronic Press Ltd, Canterbury, UK. Apr., 1997.

(List continued on next page.)

*Primary Examiner*—Shahid Alam
*Assistant Examiner*—Fred Ehichioya
(74) *Attorney, Agent, or Firm*—Lumen Intellectual Property Services, Inc.

(57) ABSTRACT

A database server contains pointers to useful information, such as on the World Wide Web. Users of the server may have hypertext links added automatically into documents they submit. Users may additionally contribute to the link database, thereby extending it, and may add additional qualifying information pertaining to the links.

32 Claims, 8 Drawing Sheets

OTHER PUBLICATIONS

Hithcock, S., L.A. Carr, W. Hall, S. W. Harris, S. Probets, D. Evans, and D. Brailsford, "Linking Electronic Journals: Lessons from the Open Journal Project." D–Lib Magazine, 1998.

Hithcock, S., R. Kimberley, S. Harris, L. Carr, and W. Hall, "Webs of Research: Putting the User in Control." In Proceedings of the Seventh International Conference on Electronic Publishing, Document Manipulation, and Typography (EP–98), Apr., 1998.

Kaindl, H., and S. Kramer. "Semiautomatic Generation of Hypertext Links: A Practical Solution." In Proceedings of Hypertext–99. 1999.

Murray–Rust, P., and 1. West. "Virtual Hyperglossary (VHG)." 1998.

Openly Informatics, I. 1999; "S–Link–S" 1999.

Probets, S., D.F. Brailsford, L. Carr, and W. Hall. "Dynamic Link Inclusion in Online PDF Journals." In: Proceedings of the Seventh International Conference on Electronic Publishing, Document Manipulation, and Typography (EP–98). Apr., 1998.

Raymond, D.R., and F.W. Tompa "Hypertext and the Oxford English Dictionary." Communication of the ACM, 31(7): 871–897. 1998.

Rizk, A., and D. Sutcliffe. "Distributed Link Service in the Aquarelle Project." In: Proceedings of Hypertext–97. 1997.

Salton, G., and J.Allan. "Selective Text Utilization and Text Traversal." In: Proceedings of Hypertext–93. 1993.

Andrew Pam, "Xanadu FAQ." 1997.

* cited by examiner

Dedicated to the Pursuit of Knowledge

Welcome to the W3K

*What would you like to do?*

- Learn about the W3K — 101
- Browse the W3K — 102
- Install W3K links in a Web document — 103
- Add to or Edit the W3K — 104
- Search the W3K Dictionaries — 105

What is the W3K?

- The W3K is a link service for

*installing links in Web documents.*

The way this works is that you submit a Web document to the W3K, and you get back the same document with links installed.

As a simple example, the text        /110

... these resources were found on the Web using the Alta Vista search engine. ...

might come back as        /111

... these resources were found on the Web using the Alta Vista search engine. ...

- With links installed, it is faster for the reader to "look up" terms that are not immediately understood.

- How it works

*Things you can do on this website*

115 —

In summary, at the W3K website, you can

- submit Web documents to *"linkify"* them using links from the W3K databases, and/or from a set of links you provide.
- search the W3K dictionaries for links on a particular topic
- browse the W3K dictionaries by topic.
- add definitions to the dictionaries.
- rate the quality of dictionary definitions.
- *Review* entries in the W3K, thus influencing their rank.

Back to the W3K home page

FIG. 2

W3K Home | Browse from Top | Select Hierarchy | Install Links | Add Subcontext | Add Key-Phrase | Add Definition | Add Synonym | Submit Dictionary File | Modify Additions | Select Context | Browse All Selected | Edit All Selected | What's New | What's Cool | Top Rated | Email Updates | Random Link | Search |

Top : Music : Computer Music : Signal Processing : Sound Synthesis : —140

Words and phrases defined in context 'Sound Synthesis' —141

Commuted Synthesis (1) new  —142      Physical Modeling Synthesis (1) new    Virtual Analog Synthesis (1) new
                                     145—

Digital Waveguide Synthesis (1) new
—144
Lagrange Interpolation (2) new

Subcontexts of 'Sound Synthesis'
147—

Acoustic Instruments (2) new      Vintage Methods (3) new
—148                       149—      —143

Synonyms

*(Synonyms presently apply only to Link Installation)*

■ Engineering : Signal Processing : Sound Synthesis

W3K: Add Definition for 'Lagrange_Interpolation'

Please fill out the form below. Required fields are in boldface.

160 — Context: Music/Computer_Music/Signal_Processing/Sound_Synthesis
161 — Topic: Lagrange_Interpolation
162 — URL: http://www.w3k.org/tutorials/lagrange.html
163 — Site Title: Lagrange Interpolation
164 — Description: Applications of Lagrange Interpolation in Computer Music

[Help] — 62
165 — Min Level: 12
166 — Max Level: 100
  — 167
Resource Type: Home Page
Your Name:
168 — Your Email: jos@w3k.org
169 — Submit Definition

[Specify Additional Properties] — 61

Site last updated 30-Sep-1999 at 18:25:33

FIG. 6

W3K: Link Installation

Paste your text *or a URL to your text or website* into the field below.

Text or URL: http://www-ccrma.stanford.edu/~jos/Welcome.html — 77

170 / [Help]

171 — Input: ● HTML ○ Plain ASCII ○ LaTeX source [Help]
172 — Output: ● HTML ○ Plain ASCII ○ LaTeX source 173 — [Submit] Specify Additional Link Properties — 174

Occurrences: ○ Link *all occurrences* of each recognized phrase
[Help] ● Link only *first* occurrence in each page — 175

● Link *all emphasized* occurrences — 176
○ Link *only emphasized* occurrences

177 — Link Type: ○ *Direct* link to *presently* highest rated link
[Help] ● *Indirect* link to *future* highest-rated link
○ Link to page of *all competing links* at the W3K 178 — Link Color: [Black ▼]

179 — Contexts: ○ All W3K contexts
[Help] ● Current = /Music/Computer_Music — 75
○ Use List 'DictList1_jos@w3k.org' (View/Edit/Set)

70 — Extensions: ☑ Append all *subcontexts*
71 — [Help] ☑ Append all *parent contexts*

Min Level: [No minimum (0) ▼] [Educational Level Help]
72 — Max Level: [No maximum (100) ▼]

173 — [Submit] Specify Additional Link Properties — 174

Site last updated 30-Sep-1999 at 18:10:34

FIG. 7

METHOD AND APPARATUS FOR FACILITATING USE OF HYPERTEXT LINKS ON THE WORLD WIDE WEB

CROSS-REFERENCE TO RELATED APPLICATIONS

This application claims priority from U.S. Provisional Patent Application No. 60/103,089, filed Oct. 5, 1998, which is incorporated herein by reference.

BACKGROUND OF THE INVENTION

1. Field of the Invention

The present invention relates to facilitating access to information over a computer network such as the Internet. More particularly, the present invention relates to technology for partially automating the linking of documents on the World Wide Web by authors of Web content. Such techniques are particularly useful for more easily creating richly interconnected information on the Web.

2. Description of Related Art

The World Wide Web provides an enormous distributed database of information interconnected physically by the Internet. One of the main difficulties for users of the Web is finding needed information out of the tremendous quantity of information that is available. Various mechanisms have been developed to address this problem.

One mechanism for facilitating access to information on the Web is the index website. An index website is typically a server computer connected to the World Wide Web which maintains an index of Web content that can be searched in various ways by users (clients) connected to the server over the Internet. Indexes are often updated automatically by means of "spiders" which systematically explore the Web looking for new or updated content. Most search engines also provide means for users to install information to be indexed, so that such information may be indexed immediately without waiting for a spider to find it. An example of a premier search engine is the "Alta Vista" website, accessible on the Web at the Universal Resource Locator (URL) address http://www.altavista.com.

A difficulty with search engines is that search results typically contain too much undesired information as well as the desired information. This occurs because the information content of the Web is vast, and because it is difficult for users to construct search parameters in such a way as to pass most desired content while rejecting most undesired content. As a result, users typically must spend a lot of time sifting through search-engine results and/or refining their searches with additional restrictions in the search parameters. Additionally, the information stored in the index is not organized in a form suitable for browsing in a logical order.

Another mechanism developed to facilitate access to information on the World Wide Web is the directory website which presents a hierarchical directory of information that can be browsed by the user. Premier sites of this nature include Yahoo (http://www.yahoo.com), Netscape (http://www.netscape.com), and Excite (http://www.excite.com). A visitor to such a site is first presented with a top-level list of topics. Choosing a topic by clicking on a topic's hypertext link with the mouse produces a list of subtopics, and so on, until a final level is reached at which useful information is displayed about the topic, or else a remote website pertaining to that topic is visited. Directory companies such as Yahoo typically have teams of editors who explore the Web looking for content suitable for reference at their site, and these workers perform a function analogous to the automatic "spiders" used by automated index websites. Like the search engines, directory websites normally support searching within the directory site, thus producing search results of generally higher quality and less "clutter" than typically encountered on an index site. Also like index websites, directory websites typically allow submission of content for reference, subject to editorial consideration. Thus, directory websites improve over index websites by providing editorial selection, logical organization, and browsing capability, all of which are absent in typical index websites.

A first difficulty, however, with directory websites is that they cannot reasonably keep up with the vastness of the information on the World Wide Web by means of manual editorial selection. As a result, directory websites tend to offer far less information relative to index websites. A second difficulty with directory servers is that their content is proprietary and controlled by a team of editors at one company. This editorial control, while ensuring consistently high quality on the site, makes it difficult and sometimes even infeasible for an information provider to obtain a desired listing in the hierarchical directory. One directory site that addresses this difficulty is the Open Directory project (http://dmoz.org/); The Open Directory allows any user on the Internet to become an "editor" for a particular topic at the site. A third difficulty related to the first is that typical directory sites are extremely broad in scope, contributing to the absence of specialized information that is not of interest to a wide general audience.

A difficulty with both index and directory websites is that information is presented without regard to the user's level of education. It is therefore often possible for a high-school senior working on a book report, for example, to encounter information understandable only by a graduate student in a specialized field. There is similarly normally no means for selecting information according to its type or source or other potentially desirable criteria.

To assist users in selecting sources of information, some websites provide a user rating system (or "scoring system") to which any user may contribute. An example of this mechanism is seen in the online book-store website http://www.amazon.com/. Amazon allows any user to contribute a "book review" and an overall rating on a five-star scale. The average rating is displayed for each book, and books which match the user's search criteria are displayed sorted according to decreasing score (and possibly other criteria such as the number sold). An interesting feature of the Amazon rating system is that it is democratic, allowing the vast quantity of World Wide Web users to jointly develop a ranking of the information sources (in this case books). Such a scheme addresses the difficulty of sorting through enormous quantities of information by harnessing a potentially enormous base of users as contributing editors, in effect. A difficulty with rating systems is that they are generally used only at the site where the ratings are collected, and no mechanism is provided for making use of the ratings elsewhere, such as in other documents on the Web linking to the same information.

An important mechanism integral to the function of the World Wide Web is the HyperText Markup Language (HTML) which is a text format supported by Web browser programs (such as Netscape Navigator or Microsoft Internet Explorer). A more recent variant called XML is now gaining support, and its function is similar to that of HTML for present purposes. HTML provides for the specification of hypertext links in Web-page text displayed by the browser. At a minimum, a hypertext link consists of text to be displayed by the browser and a link target which is usually not displayed. For example, the HTML code <a href="http://www.w3k.org">W3K website</a> contains the text (also known as the anchor) "w3K website", while the link target is http://www.w3k.org which is a URL pointing to the W3K website. Thus, the link target is normally addressed by a URL pointing to information on the Web about the displayed word or phrase. (The complete HTML format specification may be found online at the URL http://www.w3.org/.) To the browser user, the anchor text of a hypertext link as above appears in a Web-page display as an underlined word or phrase, e.g., Visit the W3K website for more information regarding automatic link installation, and usually in a different color than normal, unlinked text. By clicking on the hypertext link with the mouse, the user directs the browser program to "follow the link" by "navigating" to the URL associated with the link. The link-target URL may point to another Web page anywhere on the World Wide Web, or it may simply point to another location within the same electronic document. Hypertext links in HTML documents make it much easier for the user to explore the World Wide Web by visiting Web pages and clicking on the links found therein. Web browsers further make it easy to return to the page containing the link by using the "back" button, or the "history" list of visited pages maintained by the browser.

A difficulty with hypertext links is that they must be laboriously added by Web content providers. Typical HTML editors merely provide a data-entry form in which the URL for the link target can be typed. A second shortcoming of HTML and Web browsers is that there is no standard mechanism for specifying link properties such as educational level, type of resource, information source, or the like, which could be supported by Web browsers to give the user finer control of link display based on link properties. After the links are typed in, they must be maintained as their URLs change, and as new and better link-targets become available. There is therefore a need for automated assistance with entering, maintaining, and improving hypertext links in documents intended for a hypertext document environment such as the Web.

SUMMARY OF THE INVENTION

It is a primary object of the present invention to facilitate the addition of hypertext links (also called "hyperlinks," "'links," or "definitions") to documents intended for access on the Internet via the World Wide Web. Accordingly, the present invention is designed to provide a link installation service which automatically installs hyperlinks within information submitted to the service by hypertext authors. Submissions may be in HTML format, plain ASCII format, LaTeX source format, or a variety of additional formats to be added in the future. The output returned to the user may be in either HTML or LaTeX source format (which may be compiled into HTML format). Criteria can optionally be specified which govern the installation of hyperlinks.

The invention further provides selectable databases of hyperlinks, organized by category (or "context"), which can be optionally selected for automatic link installation. It is further provided that content developers may add their own links to the existing link databases, and they may additionally create new link databases and specify their relation to the existing link databases. Contributing users are preferably required to have a known, verified email address. A user with a verified email address is called a "known user". The invention further provides means for browsing the link databases in a logically organized, hierarchical tree structure, wherein higher-level nodes correspond to more general contexts, and lower-level nodes correspond to more specialized contexts. The link databases can additionally be searched for keyword matches within component fields. Users may provide ratings and/or reviews for individual links in the link databases.

The hyperlink databases of the present invention support various optional "properties" associated with each hyperlink. One such property, useful in the development educational content, is a level designation which indicates the educational level required for best understanding of the link-target information. Additional optional properties include the language of the content (such as English), a viewer suitability rating such as exists for movies (PG-13, R, etc.), and properties defined by the user. Link properties can be specified by users to control the automatic installation of links, and/or to control what is displayed while browsing the link databases.

Educational levels not specified on submission are estimated based on the level of links found within the link target document. As a result, every link in the link database is assigned either an educational level, either manually or automatically. Determining levels automatically detects any "cycles" in the link database. (A "cycle" occurs when document A links either directly or indirectly to document B, and document B links either directly or indirectly to document A.) Cycle detection can help content providers eliminate inadvertent "forward references." Means are provided for marking forward-reference links in submitted documents so that educational level will not be affected. Cycle-free systems of links can be more effectively used as a basis for online course materials.

Another feature of the present invention is the ability for users to rate (or score) the quality of any link in the database and/or to submit a written review of any link. The quality ratings may be averaged together and used to determine the relative ordering of the links when there are multiple link targets for the same word or phrase ("competing definitions"). In the typical case of HTML format, features of the JavaScript scripting language may be used to provide convenient access to multiple link targets, ranked according to score. Alternatively, the latest ranked list of competing definitions may be maintained on a central server on the Web, with the installed link pointing there, instead of containing only a snapshot at the time of link installation, which may rapidly go out of date. Alternatively, the currently highest rated link may be installed in the user's Web document for each recognized topic.

BRIEF DESCRIPTION OF THE DRAWING FIGURES

FIG. 2 shows a Web page giving an overview of the capabilities of the online service.

FIG. 4 shows an example lower-level page seen while browsing the hyperlink databases, in which the context has been narrowed considerably.

FIG. 5 shows an example browsing view at the level of a key phrase in which all displayed links are interpreted as "definitions" for the key phrase.

FIG. 6 shows an example form for adding a new link (definition) to the link database for the current key phrase.

FIG. 7 shows a Web page for submitting text for link installation.

DETAILED DESCRIPTION OF THE PREFERRED EMBODIMENTS

The following is a description of the best presently contemplated modes of carrying out the invention. The descriptions are not to be taken in a limiting sense but are made for the purpose of illustrating the general principles of the invention. It is particularly noted that the invention may be implemented in a variety of different file formats, database technologies, search and replace methods, computer processors and system architectures, host operating systems, network protocols, user-interface frameworks, and the like.

Client-Server Architecture on the World Wide Web

Figure 1:
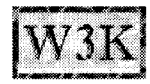
FIG. 1 shows an example initial Web page seen by a visitor using a Web browser to access the online version of the service.

FIG. 1 illustrates how a World Wide Web "home page" might appear on a website embodying the principles of the present invention. The user has several choices of where to "navigate" next:

- The first choice 101 is a hypertext link entitled "Learn about the W3K," where in this example, "W3K" is an acronym standing for the "World Wide Web of Knowledge." If this choice is selected by clicking the mouse on the underlined text, the visitor "navigates" to the Web page shown in FIG. 2 which provides an overview of the online service provided by the W3K. In particular, it is explained how submitting plain text 110 to the W3K server will result in hyperlinked text 111 being returned to the user. A summary 115 of high-level functions is also provided in FIG. 2.
- The second choice in FIG. 1 is a hypertext link 102 entitled "Browse the W3K." If this choice is selected by clicking the mouse on the underlined text, the visitor "navigates" to the Web page shown in FIG. 3 supporting browsing of the hyperlink databases, as described further below.
- The third choice in FIG. 1 is a hypertext link 103 in which the text displayed by the Web browser is "Install W3K links in a Web document." If this choice is selected, the visitor is taken to the Web page of FIG. 7 where the user can submit text for link installation in a variety of formats. The text is returned to the user by the server with hypertext links installed according to the user's specifications. Link databases to be searched can be collected into a list during the browsing operation.
- The fourth choice, "Add to or Edit the W3K," is a link 104 to a Web page for editing the link databases. Editing operations include including submitting new links, creating new link categories, and changing previously submitted links or link properties. These editing functions are also available while browsing the databases.
- The fifth and final choice, "Search the W3K Dictionaries," is a link 105 to a Web page for specifying search criteria in terms of link properties. The search collects together all links in the link databases matching the search criteria, and displays them organized by properties according to user specifications. The search feature is useful for collecting various link subsets together for various purposes including link installation, editing link properties, and other functions involving groups of links. As an alternative to a list display format, a sparse context hierarchy can be generated, containing only the database information matching the search criteria; the sparse hierarchy can then be conveniently browsed by the user.

These functions are described in further detail below.

Overview and Terminology

This section introduces the main terms which will be used hereafter.

Hierarchical Contexts

The link databases are organized hierarchically according to category, somewhat like the Dewey decimal system for library organization. Each category (or "directory") is interpreted as a context analogous to a field of study. Each context may itself contain any number of contexts ("subcontexts," or "subdirectories"), and it may additionally contain a database of information pertaining to that context (which may be a implemented in a file in that directory).

The particular sequence of directories obtained by visiting one subdirectory after another is called a path. Every context may be identified by the directory path that reaches it from the top level. Thus, the set of all contexts form a "tree structure" analogous to the hierarchical file systems used by all major computer operating systems at the present time.

Dictionaries

A link database (or "dictionary") preferably comprises a list of (key,URL) pairs. A key (or "key phrase" or sometimes "word") identifies a topic or concept, and the URL points to information about that topic on the Internet. In a loose analogy with an ordinary dictionary, the key is the "word being looked up", and the URL points to its "definition". However, unlike an ordinary dictionary, the (key,URL) pairs in the link database are interpreted within the particular context associated with the directory containing that dictionary. In a somewhat better analogy with a technical encyclopedia in a particular field, the key corresponds to the noun phrase identifying a technical topic for which an article exists in the encyclopedia, the URL may correspond to the page number on which the article begins, and the context may correspond to the technical field for which the encyclopedia was written.

Because dictionaries are interpreted in a particular context, alternate definitions are not allowed. In other words, a context is preferably sufficiently narrow such that all terms (words or key phrases) in that context have a unique meaning. Ordinary "flat" dictionaries must accommodate alternate definitions for a single word, while "hierarchical dictionaries" need not. Thus, if a term is found to have a second meaning in a particular context, it is time to create one or more subcontexts in which that term is disambiguated.

Synonyms

A single URL can provide only one "definition". However, a single URL can be used to "define" any number of key phrases, which are then regarded as synonyms. Often the title of the addressed HTML page on the Web is the "key phrase" that is "defined" by the URL. When there are several (key,URL) pairs having the same URL, the different keys are treated as alternate phrasings for the same concept or topic, and are said for form a synonym group. The following example dictionary entries provide an example of a synonym group:

KEY=Taylor Series Expansion

URL=http://www.mathworld.org/analysis/TaylorSeries.html

KEY=Taylor Expansion

URL=http://www.mathworld.org/analysis/TaylorSeries.html

KEY=Taylor Series
URL=http://www.mathworld.org/analysis/TaylorSeries.html

Order is important in the dictionary because "the first match wins" during automatic link installation. For example, with the above ordering, the key phrase "Taylor Series Expansion" will match before checking for "Taylor Expansion" or "Taylor Series". Ordering equivalent key phrases from longest to shortest ensures that the longest possible match will occur in documents submitted for link installation.

Synonyms can be listed in a link's properties, or they can simply be entered as additional link entries pointing to the same link target (URL), since links take up relatively little space.

"Key Phrase" Directories

A "key phrase" may be understood as a bottom-level subdirectory of the context tree. A key-phrase directory holds a dictionary (link database) containing at least one link. This database may be implemented as a file residing in a directory having a name derived from the key phrase. Preferably, however, all key phrases in a particular context (together with their links), plus perhaps additional contexts, are implemented in a single larger database file in the parent context directory. For simplicity, however, a key phrase will nevertheless be considered logically to be a bottom-level directory (leaf node) in the hierarchical context directory, irrespective of implementation details associated with the use of a hierarchical file system.

All of the links in the key-phrase directory are interpreted as competing sources of information on the one topic identified by the key phrase. The tangible difference between a key-phrase directory and a context directory is that the key-phrase directory has no subcontexts, only links. Thus, a bottom-level directory in the context tree hierarchy (a "leaf node" of the context tree) corresponds to a single concept or topic, and all of the (key,URL) pairs in its dictionary pertain to that one topic. The number of distinct URLs present is the number of competing sources of information.

Perhaps the simplest means for handling synonyms is to add a key-phrase directory for each alternate phrasing of each topic. Because order is important when traversing a synonym group, the context-tree implementation must provide a means for ordering sub-directories, at least when those sub-directories correspond to key phrases. Alternatively, an ordered link database file may reside in the context directory containing the key phrase, and include all other key phrases in that context as well (including synonyms); the key phrase(s) corresponding to each link may be stored as link properties.

In the preferred embodiment, synonyms are not handled as separate key-phrase directories. Instead, a single representative is selected (usually the most descriptive or canonical), and all other equivalent phrasings (synonyms) are listed in a separate synonym file in the key-phrase directory. (Order is carefully preserved.) During browsing, synonyms are displayed at the bottom of the key-phrase page.

Context Synonyms

The preferred embodiment also supports context synonyms, as opposed to key-phrase synonyms just described. Context synonyms are presently implemented using symbolic links in a UNIX file system implementation of the context tree. As an example, the context hierarchy below illustrates two different paths to the subcontext (directory) "Sound_Synthesis", where the notation "—>" indicates a symbolic link, as is typically done when listing files in a UNIX file system:

Humanities
  Music
    Computer_Music
      Sound_Synthesis
Engineering
  Electrical
    Signal_Processing
      Sound_Synthesis —>/Humanities/Music/Computer$_{13}$Music/Sound_Synthesis In this example, the "true parent" of the node Sound_Synthesis is Computer_Music, while the parent Signal_Processing is a "linked parent". There can be any number of linked parents, but only one true parent.

Symbolic links provide a means for reaching multidisciplinary fields by browsing the constituent fields in a top-down way. At any time, a symbolic link may be deleted and replaced with a copy of some or all of the directory which was formerly linked (possibly utilizing symbolic links at a lower level). In this way, closely related contexts may start out as identical, but later may evolve into separate collections, as the maintainers see fit.

Context Dictionaries

The dictionary corresponding to a particular context is defined as the union of all key-phrase dictionaries in that context. In other words, the dictionaries belonging to all key-phrase subcategories in the particular context are logically concatenated together into one large dictionary, with additional dictionary entries added for all synonyms. This dictionary is referred to as the "context dictionary". The order in which the key phrases are concatenated is prescribed.

When installing links in submitted documents, several context dictionaries are normally combined together to form a larger "aggregate dictionary" which is what is used for link installation. A typical aggregate dictionary consists of the context dictionary for the "current context" (established, e.g., by browsing), followed by the context-dictionaries of all subcontexts (usually not in any particular order, unless explicitly listed by the user), then followed by the context dictionary of the "true parent" context, followed by the context dictionary of the true parent's true parent, and so on, until the context dictionary of the top-level directory is appended (which contains extremely generic terms). Linked parent dictionaries may also be added in where desired. Since order is respected during link installation, definitions provided in the "current context" will receive first precedence, followed by definitions occurring in subcontexts (which are considered within the current context), followed by the more generic definitions of parent contexts. Since "the first match wins" in link installation, generic terms defined in parent contexts are "overridden" by more specialized definitions of the same terms of art in the current context. For example, the word "resolution" might be defined at the top level as the first definition appearing in an ordinary dictionary of the English language, while in the context of " . . . /Signal_Processing/Spectrum_Analysis" it would be given its more arcane definition regarding the resolving power of a short-time Fourier transform.

Browsing the Link Databases

There several benefits to providing browsing of the link databases:

it provides a unique educational resource which organizes valuable information on the Web in a manner especially well suited for educational purposes;

it provides a convenient means for learning what links are available for installation in documents;

it provides a convenient means for collecting context dictionaries for subsequent use in automatic link installation. While browsing, links and/or entire context subtrees can be marked for inclusion or exclusion in subsequent automatic link installations;

it provides a convenient means for navigating to contexts in which subcontexts and/or key-phrases can be added and/or edited by the user, or to key-phrase directories in which links can be added and/or edited and/or rated; and by displaying links selectively according various link properties, browsing provides a means for viewing useful link subsets, such as all links entered by the user or user's group.

Figure 3:
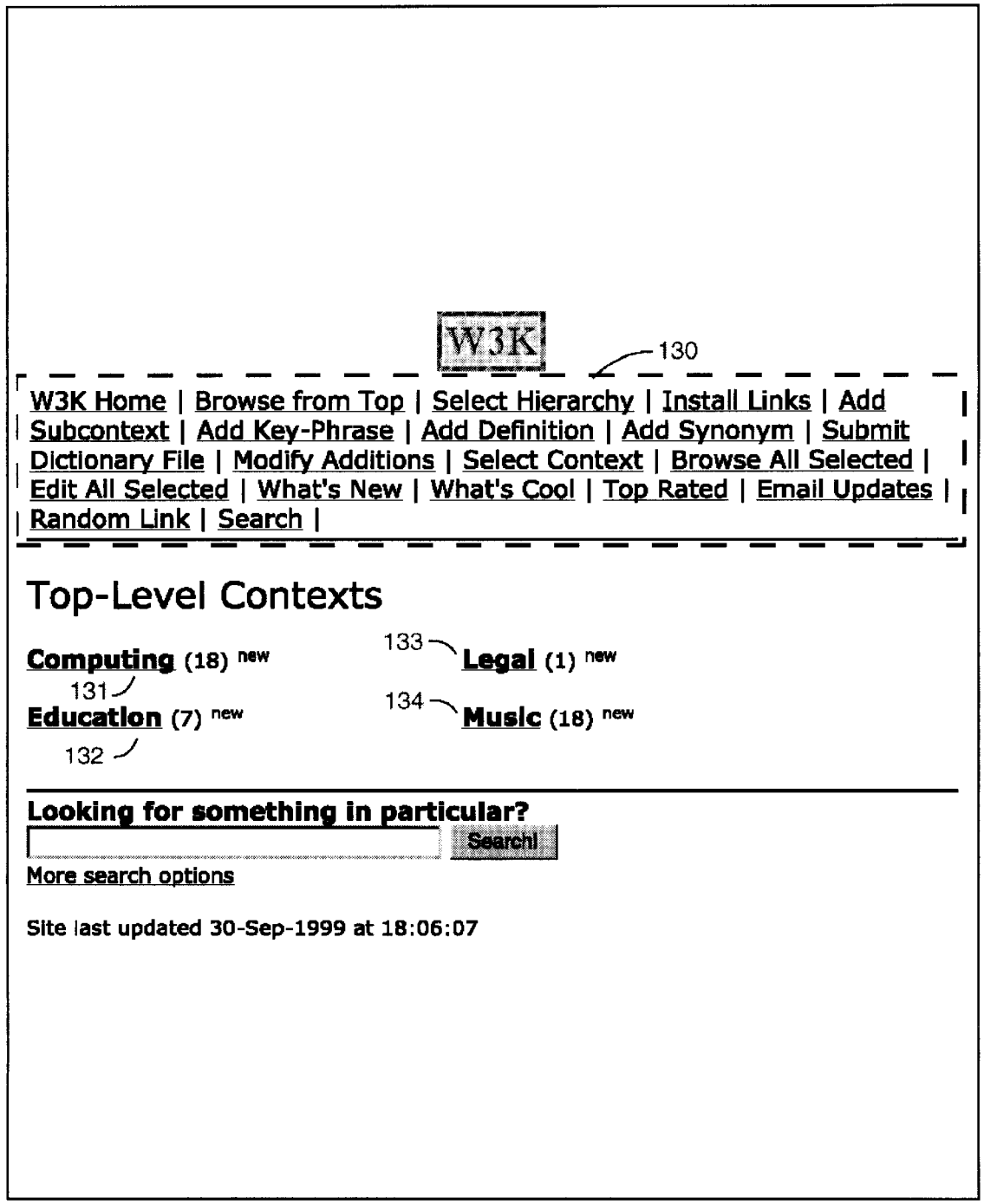
FIG. 3 shows an example Web top-level page seen while browsing the hyperlink databases.
Figure 5:
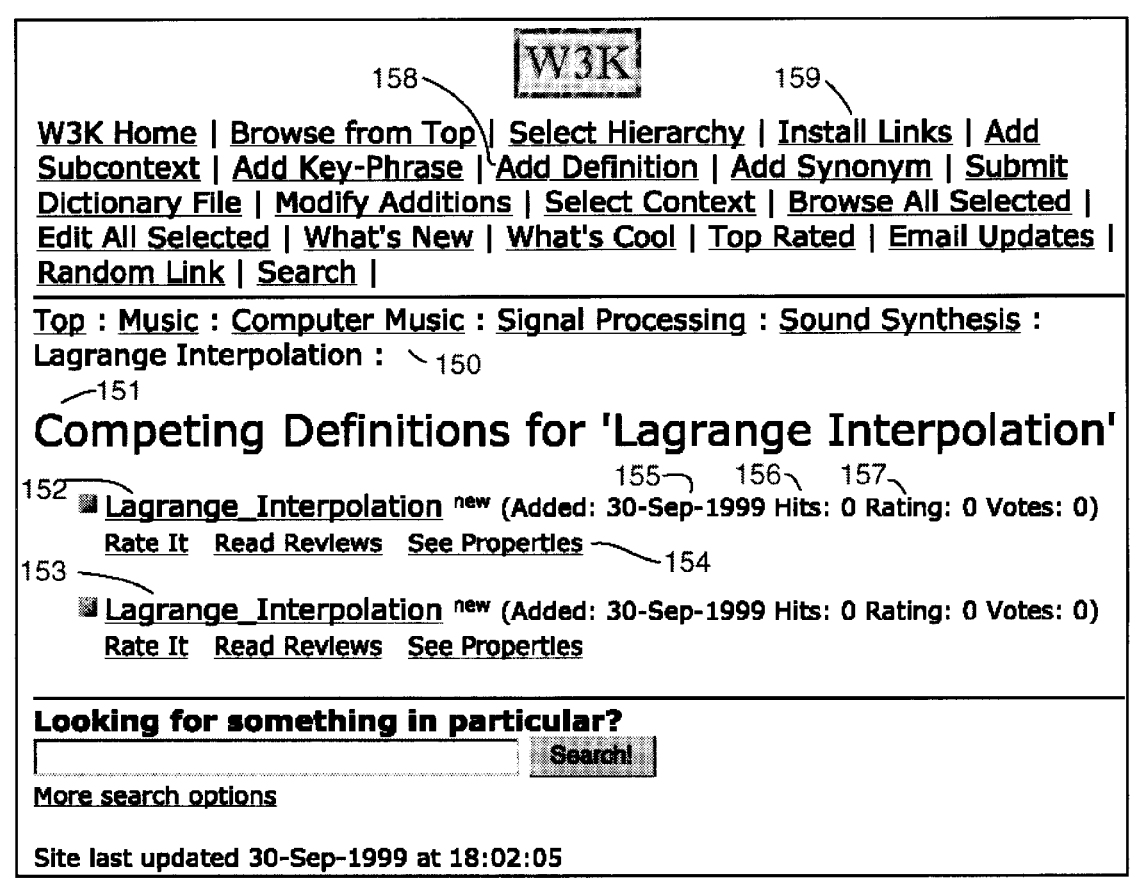

Link database browsing support on the server may be implemented in a variety of ways. As an example, there are commercially available scripts which implement directory websites, such as the links-2.0 scripts from Gossamer Threads, Inc., and such scripts can be adapted to implement the hierarchical dictionary of the present invention. FIGS. 3 and 5 illustrate the appearance of such a browsing system. Alternatively, one may use HTML SELECT pop-up menus, which are dynamically generated from the current directory contents. However, for performance reasons, static HTML pages are preferable over dynamic HTML generated by the server, when feasible. To provide more context and ease of navigation, the database directory structure may additionally be displayed in a fixed HTML frame on the left, as is currently done on many websites. For example, the way directory trees are displayed on the left in Microsoft Windows Explorer is a good model.

FIG. 3 illustrates a Web page display at the start of browsing. The top-level context is displayed. In this simplified example, only four top-level subcontexts are offered (Computing 131, Education 132, Legal 133, and Music 134). Each of these words is a hypertext link, which can be clicked with the mouse to navigate to the associated subcontext. For example, clicking on Music 134, then on "Computer Music" (which is available in the Music context), then on "Signal Processing", then finally on "Sound Synthesis" produces the page shown in FIG. 4.

The Standard Browsing Menu

Near the top of each page during browsing is a set of hypertext links 130 separated by a vertical bar '|'. This is the "standard menu" appearing at the top of every page while browsing the W3K website and at other times as well. Each of these links allows the user to carry out some available function.

The "W3K Home" link in the standard menu 130 takes the browser back to the initial W3K home page illustrated in FIG. 1, as does clicking on the W3K logo.

The "Browse from Top" link in the standard menu 130 navigates to the top-level browsing page shown in FIG. 3.

The "Select Hierarchy" link navigates to a page where a different context hierarchy can be selected for browsing. There is only one primary public context hierarchy (the one reached from the second choice 102 in FIG. 1). However, individual users and groups of users can set up context hierarchies for their own purposes, without having to worry about fitting into the ever-expanding primary public context hierarchy. If well known "language localization" methods are not available, as preferred, to provide alternate language selection for each Web page in the public hierarchy, alternate hierarchies can be used to support alternate languages. Alternate hierarchies can be designated by their creators as public (anyone can add to it), restricted (anyone can read it, but only the owner(s) can write it), or private (only the owner(s) can read or write it). The owners include the creator and members of any groups listed by the creator as being co-owners.

The "Install Links" link in the standard menu 130 navigates to the form provided for submitting documents for link installation, which will be described further below.

The "Add Subcontext" link navigates to the form provided for creating a new subcontext within the current context. Since FIG. 3 is at the top-level context, this operation is only allowed in a public hierarchy for a select group of "trusted" users.

The "Add Key-Phrase" link leads to the form for adding a new key phrase in the current context. At least one definition link is required when adding a new key phrase. At the top level of the public hierarchy, this operation is restricted to trusted users since any key phrases appearing at the top of the hierarchy are "generic terms" having definitions which are independent of context. Truly global key phrases such as domain names and trademarks are appropriate at the top level.

The "Add Definition" link is for adding a new definition for a key phrase. This entails supplying a URL which points to information about the URL and some other information, as will be later described. Thus, the number of distinct URLs in the set of URLs associated with a particular key phrase can be increased from 1 (its usual initial value) to any number by adding more definitions. The "Add Synonym" link in the standard menu 130 allows the addition of a key phrase to a list of "synonyms" for an existing key phrase. A synonym can also be constructed for a context. Synonyms will be described further below.

"Submit Dictionary File" provides convenient submission of a large numbers of links (key phrases and definitions) as well as the ability to specify context path for each one, as will be described. It is additionally possible to display specified contexts and contexts selected for link installation in the form of a dictionary file. For example, a user can perform a search in order to collect all links contributed by that user, display the results as a dictionary file, save the dictionary file on his or her local computer, perform any desired editing operations, and submit the edited dictionary file back to the server to update his or her links on the server.

"Modify Additions" allows the user to edit (modify or delete) any information he or she submitted to the W3K site. In particular, it is possible to modify link properties, delete a link, delete a context or key-phrase directory wholly owned by the user or user's group, and so on. A user belonging to one or more groups may edit any information submitted by anyone in any of those groups. A set of records to be edited can be created by means of the search facility. A record may hold the information associated with a link, key-phrase directory, or context directory.

"Select Context" selects the "dictionary" associated with the current context for inclusion in subsequent "link installation". The context dictionary normally includes each key phrase in the current context together with at least one definition for each key phrase. It may also include similar information from parent contexts and subcontexts, as will be discussed. Thus, the aggregate dictionary used in link installation is like a kind of "shopping cart" that can be filled with component dictionaries found while browsing around the context hierarchy; in this analogy, "items to be purchased" correspond to the dictionaries to be used in link installation.

It is also possible to assemble various context directories into an aggregate dictionary for link installation without browsing by simply providing a context dictionary list, or by selecting contexts from a number of SELECT menus in HTML listing all available contexts. After the current context is selected, the "Select Context" link changes to "Deselect Context", so that clicking on it takes the current context out of the aggregate link installation dictionary.

Selection configuration information lower in the hierarchy is not modified when excluding a context, so that re-selecting the context allows the contained selection configuration to become active once again. During link-installation (FIG. 7), it is possible to override all such selection information by simply specifying an explicit list 75 of context dictionaries, or selecting "All W3K contexts" in the form entry for contexts 179.

Browser "cookies" are very useful for storing the context search preferences for the user across sessions; since many tend to work in one or a few fields, it is often the case that the contexts used for link installation do not change very often. Browser cookies are simply information stored on the user's computer (the client computer) by the server; cookie files are supported by the major Web browsers such as Netscape Navigator and Microsoft Internet Explorer. If cookie files are not available for any reason (they can be disabled by the user), preference information can be stored on the server indexed by the user's email address, which is unique among users.

"Browse All Selected" places hierarchy browsing in a special mode in which only the currently Selected contexts and links are visible. This can also be reversed so that only deselected contexts are visible. (Sometimes it is helpful to go back and forth.) This feature can help the user more quickly review what link databases ("key-phrases" and "definitions") have been selected for link installation.

"Edit All Selected" is similar to "Modify Additions" except that instead of determining the list of database elements to be edited by using a search (or direct specification), it is initialized from the set of selected links owned by the user and/or groups to which the user belongs.

"What's New" creates a list of all contexts, key phrases, or definitions which have been added recently to the system.

"What's Cool" creates a list of all contexts, key phrases, or definitions which have been receiving relatively high traffic ("hits") recently.

"Top Rated" creates a list of highest ranked links in the database. These are generally excellent home pages, tutorials and the like on various topics.

"Email Updates" allows the user to subscribe to the W3K newsletter.

"Random Link" takes the user to a randomly chosen definition link.

"Search" supports general search for information within the current context and beyond.

Context Path Display

While browsing, the "context path" 140 (FIG. 4) is displayed just below the standard menu 130, with each path element separated by a colon ':'. In FIG. 4, for example, the context path is displayed as "Top: Music: Computer Music: Signal Processing: Sound Synthesis." Clicking on the "Lagrange Interpolation" key-phrase 144 in this context takes the browser to the definition page for Lagrange Interpolation shown in FIG. 5.

Search Form

Below the horizontal line in FIG. 3 is a search form. Typing text into the field and clicking on the "Search!" button results in a dynamically generated web page listing all links (in all contexts) matching the search criteria. More refined searches can be carried out by first selecting the "More search options" link. Since links have quite a few properties (to be discussed), searches can be honed rather finely without relying entirely on typical means for selecting a subset of all names and phrases within contexts, key-phrases, and definitions.

Topics under a Context

FIG. 4 displays the contents of the context-path /Music/Computer_Music/Signal_Processing/Sound_Synthesis.

We see that the "Sound$_{13}$ Synthesis" context contains two subcontexts "Acoustic Instruments" 148 and "Vintage Methods" 149.

In addition to subcontexts, there is a list labeled "Words and phrases defined in context Sound Synthesis" 141. (For greater convenience when browsing contexts, browsing can be configured to show only a single link to the key-phrase list on a separate page.) The phrases listed include "Commuted Synthesis" 142, "Physical Modeling" 145, and "Lagrange Interpolation" 144.

Technically, as far as the browsing function is concerned, "words and phrases" (key phrases) are similar to "subcontexts". However, key phrases are browser categories with no subcategories, only links, while contexts are browser categories containing subcategories (either subcontexts or key phrases). The links under a key-phrase are treated as "competing definitions" for that key phrase.

Figure 8:
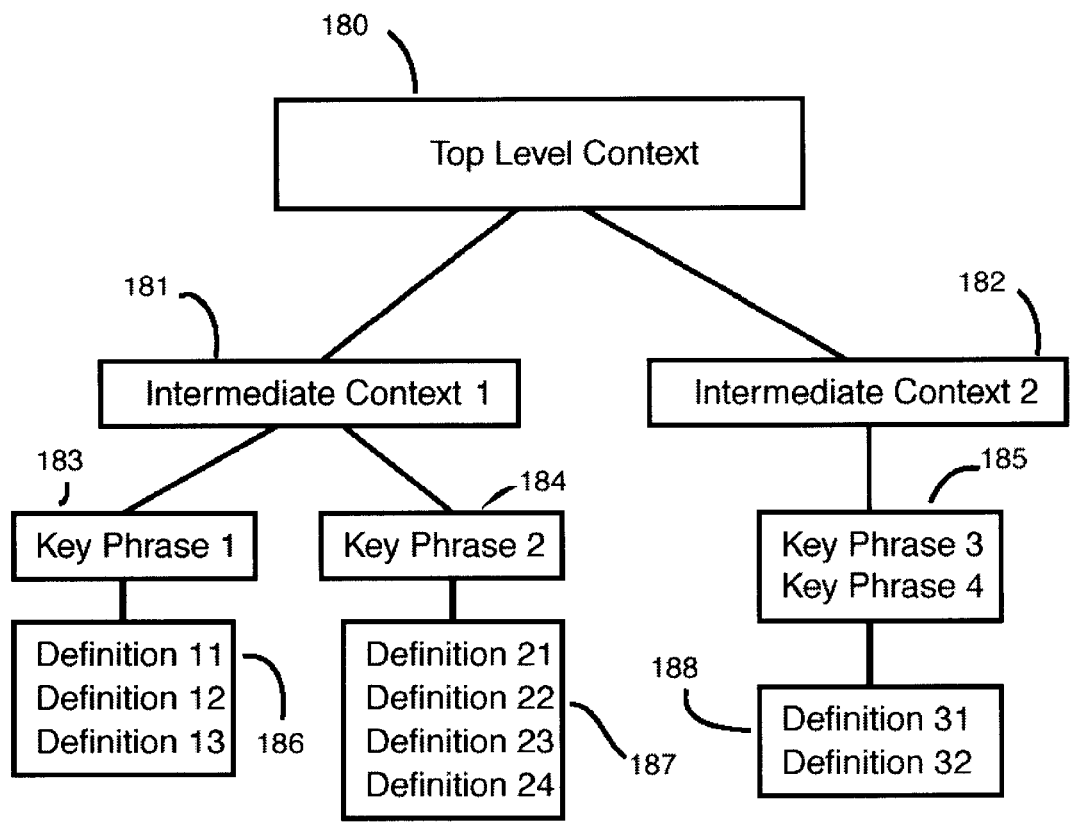
FIG. 8 depicts the tree structure of the hierarchical link database.

FIG. 8 illustrates the relationships among contexts, key phrases, and definitions. The top level context 180 is the root node of the tree structure defined by the hierarchical link database. There can be any number of subcontexts or key phrases under the top level context 180. In the example of FIG. 8, there are two subcontexts, "Intermediate Context 1" 181 and "Intermediate Context 2" 182. Since these are context directories, they each may contain any number of subcontexts and/or key phrases. In the present example, there are two key phrases 183 and 184 in the first subcontext 181 and one synonym group 185 (two equivalent key phrases) in the second context 182. A key phrase must have at least one definition (link) associated with it. In the present example, "Key Phrase 1" 183 contains three competing definitions 186, "Key Phrase 2" 184 contains four competing definitions 187, while the synonym group 185 consisting of "Key Phrase 3" and "Key Phrase 4" contains two definitions 188 to choose from for that synonym group. Since order is important, we may choose a consistent ordering convention for tree diagrams in which the ordering of all subnodes of a node is defined as left to right in a diagram as in FIG. 8.

Note also in FIG. 4 that the "Sound Synthesis" 141 context includes one synonym 143. This is a context synonym identified by the path Engineering: Signal Processing: Sound Synthesis which can be thought of as a different context path to the same place. A context synonym can be thought of as a "symbolic link," in the sense of a UNIX file system, from one "context directory" to another. It is often appropriate for multidisciplinary fields, such as the field of sound synthesis, which belong as a subcontext of more than one high-level context. In link installation, context synonyms can provide what is analogous in computer science as "multiple inheritance", i.e., the dictionaries of multiple parents ("Music" and "Engineering" in this example) can optionally be included automatically in the formation of the aggregate dictionary for link installation, while only the one main context ("Sound Synthesis" in this example) has to be selected for link installation.

To illustrate a "context synonym in FIG. 8, we could add a third subcontext box under the "Top Level Context" box 180 entitled "Intermediate Context 3" which could have a different kind of border to indicate that it is a symbolic link to some other context. We could then draw an arrow from the "Intermediate Context 3" box to its equivalent, such as either "Intermediate Context 1" 181 or "Intermediate Context 2" 182.

FIG. 5 shows a display of two "competing definitions" for the phrase "Lagrange Interpolation" 151. Either of the two links 152 or 153 may be installed in a document containing the phrase "Lagrange Interpolation". They are both named "Lagrange_Interpolation" because that happens to be the title of both Web documents. However, the links point to two different targets on the Web written by two different authors.

The "new" superscript after a link 152 or 153 means it was added relatively recently. In this example, both links for "Lagrange Interpolation" were added on the same day.

The "popular" superscipt for a link 152 or 153 means it has been receiving relatively frequent visits (or "hits") via the W3K site. The number of hits displayed in this case is 0.

Also displayed in FIG. 5 for each link 152 or 153 is the date 155 the link was submitted, the number of hits 156 (number of times a anyone as clicked on the link at this site), a rating 157 for each link (which is 0 since the links were just added), and the number of votes included in each rating (also 0 at the moment). Available elsewhere on the website also is the number of times a link has been installed in Web documents. Finally, there are three links 154 for rating each link (assigning a quality score from 1 to 10 and optionally submitting a more detailed written review), reading the reviews written by others, and viewing all of the link's properties in tabular form. After the rating display is a hyperlink which a user can select in order to contribute a rating or a review of the link.

This completes a first-pass overview of the main pages and selections seen by the user while browsing the link databases. Functions available while browsing will be described further in the following sections.

Adding or Modifying Definitions or Categories

In FIG. 5, the "Add a Definition" link 158 navigates to the form shown in FIG. 6 for adding another definition link for Lagrange Interpolation. The current key phrase "Lagrange Interpolation" is filled into the "Topic" field 161, and the context path leading to the key phrase is filled into to "Context" field 160. This makes it convenient to enter a new source of information (definition) on a topic (key phrase) while browsing.

When "Add a Category" or "Add a Key Phrase" is selected from the top-level context (or "Add . . . " is selected on the main website home page), the "current context" field of the form becomes instead a pop-up HTML "select" list containing all of the contexts presently in the database, making it convenient to quickly select any context in which a new subcontext or key-phrase is to be added.

The only required fields on the add-definition form (FIG. 5) are the URL 162 and user's email address 169. All others are optional.

The URL is the new definition, and it is tested by the server to make sure it is responding. If the Site Title field 163 was left blank, the title of the Web page addressed by the URL, which is automatically retrieved by the server (using the Perl LWP module), is filled in automatically as the link title.

The contributor's email address is required because all submissions to the server in the preferred embodiment are associated with the contributor's email address. However, there are alternative means for identifying users known in the art, such as a more conventional registration procedure in which the user chooses a login name and password. The preferred embodiment ensures that the email address given really reaches the user. If the user is new, an authorization process, described in §5.1.9, is initiated which tests the user's email address.

While not required, the link contributor is invited to write a short description 164 of the website, specify the minimum 165 and maximum 166 educational level covered at the site (usually done by the author of the site), and specify the type of resource 167 (home page, conference paper, book chapter, or the like). The user may also type in his or her name 168.

Fields such as educational level 165 that are potentially confusing tend to have a "Help" link 62 next to them. For example, the educational level help 62 explains that the numerical value is in units (loosely) of "years of education likely required to understand the material". A minimum level with no maximum level corresponds to setting one level rather than a range of levels. When no educational level at all is provided with the definition, the link server will attempt to compute it automatically based on the level of the links it contains, as will be described. In a script-based submission, finer control is possible using additional level-related properties.

Things like "educational level" and "resource type" are examples of link properties. The context path leading to a link is also one of its properties, as is its URL, title, description, and so on. A link can have more properties than these, some of which will be described below. The "Specify Additional Properties" link 61 takes the user to a larger form where the additional properties can be specified.

When the user is satisfied with the filled in definition-submission form, the submit button 60 can be pressed to send the form to the link database server (a computer at w3k.org in this case). At that point, the server tests the URL by retrieving the first page, checks that the user's email. address is known and that the user's IP address and cookie information match information previously stored on the server (otherwise authorization is carried out), checks for duplication of the key phrase and URL in the given context, possibly checks the URL target for "inappropriate content", assigns an automatic educational level if none was provided (unless automatic level assignment is already scheduled at regular intervals), and adds the new definition to the link database for the current key phrase (and context path, if the database file holds links for multiple key-phrase contexts). If the addition was successful, the user is navigated to a dynamically generated Web page summarizing the information added to the database. If there were any problems, an error page is generated listing the reason(s) for failure to accept the page.

A far quicker means of entering definitions is by means of dictionary file submission which can be regarded as a script-based replacement of the above browser-based interface. An example of such a dictionary file is given in a later section. The form for submitting such a file may be reached via the "Submit Dictionary File" link in the standard menu, or as an option under the "Add to or Edit the W3K" option on the server home page.

Private Context Trees

As mentioned when describing the standard menu 130, known users may optionally create a new top-level context tree which is private to that user or to one or more groups identified by the user. This mode of usage is advantageous for private usage without incurring collisions with links in the main "global" context tree shown in FIG. 3. It is further the only way a known user can submit large quantities of contexts, key phrases, and links by means of a dictionary file submission, since that operation is not permitted in the global public context hierarchy. Further details will be described.

UserAuthorzation

Whenever a user requests an operation on the server requiring information to be stored on the server (any "editing operation"), the user must be "known." Being known means the email address of the user has been given by the user to the server, and the email address has been verified by the server to work (reach the user). When an editing operation of any kind is requested (including the simplest form of link submission, or even a link rating from 1 to 10), if the user is not yet known, an "authorization process" is carried out as a preliminary step in the desired editing operation.

In the authorization process, the user submits his or her email address in a simple Web-page form, and the server (1) emails a randomly generated ASCII string to that email address, and (2) navigates the user to a Web page containing a form for receiving that random string from the user. The form also instructs the user to receive the email and to paste the random string into the second authorization form and submit it. This process verifies that the email address in fact reaches the user.

The email address and IP address of the user are then saved on the server. Additionally, the same information is written on the user's computer using a browser cookie. If the cookie goes away for any reason, or if the user later comes in from a different IP address for which authorization has never occurred (e.g., due receiving a new dynamically assigned IP address from an ISP, or using for the first time a different home computer connected directly to the Internet), authorization is triggered once again when any editing operation is requested. Users coming in over dynamically assigned IP address generally have to be authorized for each session until all such IP addresses have been seen and logged on the server along with the user's email address.

After a successful authorization, the user may use the "Back" button in his or her Web browser to find the page which triggered the authorization process, and resubmit the form successfully.

Link Properties

Many other properties can be specified for a link besides the URL 162 and email address 169. One of the most important properties, brought out in the main form, is educational level 165. Both a minimum 165 and maximum level 166 can be set. When the link-target document is written at a single well-defined educational level, such as "$_{10}$th grade", the min and max can be set to the same value (such as 10), or the max can be left unset (which defaults to level 100, meaning no maximum). When the document spans a wide range of educational levels, such as a well designed "topic home page" might do, the min and max can be set appropriately to cover the estimated range. The minimum level still sets the official "level" used in automatic level assignment for other documents, but the maximum level, if specified, may affect link installation when a specific level range is specified for that. An educational level is implemented a floating-point number, so that a level of 10.5 can be specified, e.g., in the form 165 or 166.

Another important link property, also on the main form, is resource type 167. Resource types include dictionary definition, encyclopedia article, unpublished article, conference paper, talk overheads, refereed journal article, book chapter, book, tutorial, lecture notes, course readers, and the like. Sometimes authors may wish to screen out non-refereed sources such as conference papers or unpublished works. Of course, refereed publications and books will typically be hosted on the website of a publisher, requiring some form of payment for access, such as a site subscription or, preferably, a per-page "micropayment" such as the well known Millicent system provides.

Additional optional properties may be specified on a second form by selecting the "Specify Additional Proper-ties" link 61. Additional properties include source type (individual, educational institution, company, non-profit organization, etc.), geographical location, language (English is assumed by default), "viewer suitability" analogous to 'PG-13', 'R', etc., for movies, a list of groups to be granted editing access, and so on.

Link properties added automatically by the server when installing a link in a database include a unique integer ID, the email address and IP address of the link contributor, the date of submission, an initial rating of zero, an initial zero number of "hits", an initial zero number of "installs" in documents, and the like.

Link properties make it convenient to specify "virtual link database directories" which include only the links satisfying certain criteria specifiable in terms of link properties. For example, a user may ask to see only tutorials and books in a certain educational level range. Alternatively, an author may specify seeing only links belonging to that author's email address, or group. Thus, properties enable selective browsing (or listing) as well as more selective link installation. Such selective browsing may be specified using the Search feature on the site home page 105, standard menu 130, or at the bottom of any Web page seen while browsing.

Link properties may also be usefully included in installed links (within HTML "comments" or in specially defined XML tags) when indirect links are being installed (that is, when the installed link points to a centralized link server which forwards the user's browser to the ultimate destination). Installed link properties may be interpreted by the link server to provide additional control over link behavior. For example, a teacher using Internet documents for a $9^{th}$ grade class could configure the link server to suppress all links having an educational level greater than 10. That way, when educational level properties are available for all links, as the present invention provides, documents may be populated with hyperlinks which can be configured not to refer a student to information at a more advanced level than the teacher desires. The teacher may further suppress any links with a viewer suitability rating below a certain value. In summary, installed link properties enable dynamically configurable link behavior based on link property values.

In another use of installed link properties (which requires either browser support and/or local editing of the HTML containing the installed links), link properties can be associated with "classes" in "cascading style sheets" (an add-on to HTML) in order to display links to dictionary definitions in one manner, encyclopedia articles in another manner, and home pages in another, etc.

Restricted Directories

When a subcontext is created, it can be marked as "restricted" to the owner (creating user) or to groups specified by the owner. Restricting a directory prevents anyone but the owner or specified groups from modifying the subdirectory. The restricted directory can optionally be made "invisible" to users other than those having modification rights, in which case the restricted directory is said to be "private". An unrestricted directory is said to be "public". A restricted directory can be deleted or renamed or otherwise reorganized no matter what it contains. Typical uses of restricted directories include > Retaining the ability delete the entire directory and rebuild it with a dictionary file submission.
>
> Supporting a private dictionary corresponding to a particular project, such as a book, in which it is desired to have complete control over all links used in link installation.

The name of a restricted directory has the name of its first group (or owner, if no access groups are defined) automatically appended as a suffix to the name chosen by the owner in order to prevent conflicts with public directories and other restricted directories on the same topic. With this convention, any number of users may have restricted subdirectories on the same topic. For example, in the subdirectory "/Music/Computer_Music/Synthesis/" there could be Commuted_Synthesis_by_mak@vipunen.hut.fi/
Commuted_Synthesis_by_jos@ccrma.stanford.edu/

In this way, any number of experts may provide their own "packages" of links on the same topic.

A known user may even create a new top-level hierarchy which may be designated public, restricted, or private. User- or group-owned hierarchies of this nature which lie outside the primary public hierarchy may be placed in a special standard menu item entitled "Alternate Universes", e.g., to indicate that they are not a part of the primary public context hierarchy.

Link Ratings and Reviews

When browsing reaches a key-phrase directory, as shown in FIG. 5, following each competing definition 152 or 153 is the hyperlink "Rate It" which navigates to a form where that definition (link) can be rated on a scale from 1 to 10, and/or a written review about that link can be submitted. If the user is not known, an attempt to submit a rating or review routes the user to the authorization page, and after a successful authorization, the rating or review is accepted by the server.

All ratings and reviews are stored on the server along with the email address (and IP address) of the contributor. Only one rating and review are allowed per item per email address, but the user owning the rating or review can modify either at any time. Certain "trusted" users, such as website editors or expert consultants enlisted to help with ratings and reviews, may be given higher weighting in the ratings, and the reviews may be organized by editors according to their quality. Otherwise, the rating system is straightforward and similar in functionality to the five-star rating and review system used at http://www.amazon.com for books.

Link Installation

A primary function of the invention is to facilitate the installation of hyperlinks in documents intended for the World Wide Web. This section provides a detailed description of link installation in the preferred embodiment.

Installed-Link Types

There are at least four alternative ways to install a link in a document.

In the first mode, a hypertext link is installed directly to the top-ranked source of information on the topic identified by the matching key phrase in the user's submitted text. This is the first choice presented in the "Link Type" radio-button-group 177 of the default link installation form (FIG. 7). A disadvantage of this approach is that links often become "stale" due to changing ISPs, changing filenames, etc., requiring the links to be re-installed from time to time. (The link installation server preferably tests all links in its databases periodically and eliminates them if they are unavailable for a prolonged period of time, such as more than a week. When all links containing a bad URL are automatically removed from the databases, all owners of the links are notified automatically by email and invited to submit an updated version of the link(s).)

The second approach is to install an indirect link which links via a centralized server (such as a website providing the link installation service). This choice is provided by the second radio button in the "Link Type" portion 177 of the default link installation form. Such an intermediate website acts as a so-called "proxy server" for the link. Indirect links may always point to the most up-to-date, top-ranked source of information on any given topic. An example URL syntax for this mode of operation is http://www.w3k.org/jump.cgi?ID=35 where it is assumed that each link has a unique integer identifier on the proxy server, and jump.cgi is a CGI script which is passed the identifier as if it were a form submission in which the form contained a field named "ID" with the value 35. To avoid having to assign unique identifiers across all contexts, the context path can be included in the URL, e.g., http://www.w3k.org/jump.cgi?ID=3&PATH=Engineering+Signal_Processing Context paths can similarly be assigned integer IDs in order to shorten indirect URLs.

A third approach is to insert a link to the "key-phrase page" itself at the centralized server (the page on the server listing all "competing definitions" for that key phrase). This is the third and final choice in the "Link Type" radio group 177. In this case, an end user following such an installed link will see all competing definitions, in ranked order, instead of only one. The end user can then request that the definitions be reorganized according to various criteria such as educational level, document size, type of resource (article, book, etc.), type of source (.edu, .org, .com, etc., individuals, etc.), and so on, by making requests of the server interactively, or by means of preferences registered with the server.

A refinement of the third approach is to build or generate a more helpful "key-phrase home page" on the link server. This page could provide for example, a brief definition, followed by an organized presentation of all available sources of information, organized by type and ranked according to quality in each case. In this format, the casual user may be satisfied with a mere dictionary-style definition, while the serious scholar can more readily pursue a wider variety of sources beyond merely the top-ranked source. Providing interactive reorganization of the definition page according to end user preferences is preferable in this case as well.

A fourth approach is to use JavaScript features to install a snapshot of the key-phrase home page at the time of link installation. In this approach, a JavaScript pop-up menu may hold a list of all competing links for the linked topic.

Example Key-Phrase Home Page Format

Below is an example of how a very simple "key-phrase home page" might be laid out:

TABLE 1

| Key Phrase: Dictionary-style definition |
| --- |
| Link to highest-rated online encyclopedia-style article |
| Link to highest-rated online tutorial, if available |
| Link to highest-rated textbook covering this topic, if any |
| Link to educational resources (online courses, degree programs, etc.) |
| Highest rated related links ("See also" type information) |
| Rank-ordered list of encyclopedia-style links |
| Rank-ordered list of online tutorials |
| Rank-ordered list of other online information |
| Rank-ordered list of contributed links of unknown type |
| . . . |
| Last unrated contributed link of unknown type |

The link database server preferably provides periodic link testing, average ratings computation, link reordering, automatic educational level assignment, and so on. It is also straightforward for the server to format the key-phrase home page dynamically according to user preferences based on link properties and other criteria. For full generality, it is desirable to customize and differentiate key-phrase home pages on the basis of language, educational level, and other properties. (They are already segregated according to context by the context hierarchy in which they reside.) To address the potential enormity of this task, a mechanism for allowing known and trusted users to submit key-phrase home pages for installation on the server can be provided. For this purpose, the server can provide a template document containing variables that are filled in by the server, in a manner often found in website construction tools.

Link Color

While copious linking makes a set of documents very convenient to navigate among, the high density of links can be distracting to the eye. For this reason, the link installation submission form provides a checkbox for requesting that the hypertext links be set to the same color as the surrounding text. This leaves only an underline to indicate each link. Presumably, future versions of HTML and browsers will allow finer control over the display modes of links, and it may in some cases be possible to offer turning off all visual indications that a link is a link. This is because when links are installed at very high density, such as this invention makes possible, the reader can assume that essentially all nontrivial words are linked. Links become the rule rather than the exception for all "uncommon" words in a document.

Avoiding Links Altogether

In an alternate mode of usage, any word or phrase can be selected in text displayed by the user's browser and "looked up" at a server website containing the link databases. A similar mechanism is currently available in Microsoft Internet Explorer 5: The right-click menu contains an entry "See more with Lycos!" which, when selected, causes the selected phrase (or word last clicked with the mouse) to be looked up in the search engine at the Lycos website (http://www.lycos.com).

In the case of the present invention, in which the database server may act in place of the Lycos website, if the word or phrase is found in the link database, the user may be taken to the page of "competing definitions" (all links) for that topic. If the topic is available in multiple contexts, a list of all distinct contexts can be first displayed, so that the user can select which one he or she had in mind, and then be taken to the definition page in the selected context. If the term is not in the link database but coincides with a context directory name, that directory can be displayed by the browser. As a last alternative, the unrecognized phrase may be forwarded to an ordinary online dictionary (for single words), encyclopedia, or Internet search engine. The link-free look-up mode described in the previous paragraphs can be supported in any number of applications, not just Web browsers. For example, the word processor Microsoft Word already supports looking up an ordinary dictionary definition of a word by selecting the word and choosing the "Define" item in the right-click pop-up menu. Another item in that menu could be "Look it up at the W3K", for example. A link-free look-up service of this nature could be provided in any application which displays text and supports text selection by the end user. The service can be provided either over an Internet connection as described above, or, in the absence of an Internet connection (or supplementary to it), using the single-computer embodiment of the present invention described in §5.2.

In the preferred embodiment, end users of the link-free lookup service may optionally register with the database server in order to specify preferences such as whether a key-phrase lookup (sans link) should navigate to the key-phrase home page or more directly to the currently highest ranked definition for that key phrase. The user may also inform the server of his or her educational level, desired viewer suitability range, and the like.

To support link-free lookup mode, the database server may accept a URL containing a "virtual form submission" of a link-free lookup form. As a simple example, a lookup request for the phrase "Hubble constant" could be sent to the database server by "navigating" to the URL http://www.w3k.org/linkfreelookup.cgi?TEXT=Hubble+constant The CGI script linkfreelookup.cgi runs and may immediately issue a "navigation" output to the highest ranked link matching "Hubble constant", if any. The URL may also include a user name. If user preferences exist, the script may alternatively navigate to a key-phrase page of competing definitions for the Hubble constant, and so on. Additionally, any number link properties may be specified in the URL as well.

Link Installation Form Operation

FIG. 7 shows the default web page for submitting documents to have hypertext links installed by the server. The user pastes text to be "linkified" directly into the "Text or URL" textfield 170. In this example, a URL 77 has been specified, indicating that an entire website is being submitted for link installation, as will be described further below.

Three input submission formats may be specified by the "Input" radio-button group 171: HTML, Plain ASCII, and LaTeX source. In addition, there is a "Help" link 174 which navigates the user to documentation on the relevant considerations for each choice.

In the example of FIG. 7, submission of HTML format is selected in the input-format radio group 171. In the case of "plain ASCII" submission, the output is also normally received in HTML format; this facilitates fast construction of Web pages from simple ASCII text files. It also can be used to quickly obtain a browsable Web directory from a list of keywords generated by other means. Since some HTML editors support "drag and drop" link installation from another document, an automatically generated list of HTML links can be very useful even for manual link entry in an HTML editor.

In the case of LaTeX source format, links are installed in the form of an invocation of the macro \htmladdnormallink{text} {target}, which is defined in the widely used html.sty LaTeX style file.

When the input format is HTML, it is parsed to prevent accidental replacement of HTML tag data with links. In particular, it is important not to install links within the anchor text of existing links. HTML parsing can be accomplished using the HTML Perl package (see, for example, page 716 of the Perl Cookbook by T. Christiansen and N. Torkington, O'Reilly, 1998). In a similar manner, LaTeX directives are avoided in the text matching algorithm within LaTeX source. (Perl for LaTeX parsing is available in the latex2html Perl script, freely available at http://ctan.tug.org/ctan/.)

Linking is preferably suppressed when the recognized phrase coincides the name of the current section or document, i.e., a phrase that results in a link to the current page.

When "Link only the first occurrence . . . " is selected in the first half 175 "Occurrences" section of the link-installation submission form (FIG. 7), only the first occurrence of the phrase is linked each page (HTML) or section (LaTeX). Otherwise all occurrences are linked.

A second pair of radio buttons 176 exists for specifying that links be installed for either all emphasized words or phrases, or only emphasized words or phrases. Emphasized occurrences may appears as "\emph{. . .}" in LaTeX and as <I> . . . </I>or <B> . . . </B>in HTML.

The two radio-button-pairs 175 and 176 can be considered to specify "two bits" which select among the following cases:

TABLE 2

| | |
|---|---|
| 00 | link all occurrence of a key phrase, whether emphasized or not; |
| 01 | link all occurrences of a key phrase, but only when emphasized; |
| 10 | link the first occurrence of a key phrase in each page (whether emphasized or not), and all emphasized occurrences; and |
| 11 | link only the first emphasized occurrence of a key phrase. |

As a further special case, any URLs found as plain text in the source are by default converted to links that display their own URLs as anchor text. Many email programs and word processors presently perform this transformation on URLs detected as plain text in received email.

The "Link Type" radio button group 177 selects among three of the basic installed link types discussed in the first subsection of this section.

The "Link Color" select pop-up list 178 provides for link color selection as discussed above. In addition to the standard color names, there is a "take default" selection which does not specify the link color, thereby leaving it to the HTML cascading style sheet or user's browser to choose link color.

The "Contexts" radio group 179 provides some high-level choices of context selection for link installation. The first choice, "All W3K contexts" corresponds to combining all context dictionaries in the entire context hierarchy. As the context hierarchy grows, this can become a computationally expensive option, even when the aggregate dictionary is maintained as an existing file at all times. When a "current context" exists (as result of browsing or user preferences), it and its extensions are preferably listed first in the aggregate dictionary, as will be clarified further below.

The second radio button in the "Contexts" radio group 179 selects only the "current context" (/Music/Computer_Music). The current context is normally established by browsing or by standing user preferences. (When "Install Links" is selected in the standard menu 130 while browsing, the last context displayed in the browser becomes the default current context.) A browser cookie is preferably used to remember the most recent "current context" for each user across sessions.

Installing links from only the current context is not as narrow as it may seem at first since normally the context dictionaries for /Music and '/' (the top-level generic dictionary) are included, as well as all subcontexts of Computer_Music. The two "Extensions" checkboxes 70 provide all-or-nothing control over appending parent and subcontext dictionaries to the current-context dictionary. Additionally, if the subcontext /Music/Computer_Music/ Sound_Synthesis is a synonym for /Engineering/Signal_ Processing/Sound_Synthesis, say, and if "multiple inheritance" is enabled at all subcontext hierarchy levels (an advanced link installation option), then the context dictionary for all of Signal_Processing and /Engineering would be folded in, at a lower precedence level, of course, since they are listed after all subcontexts of /Music. In summary, the aggregate dictionary list built for link installation by the server can be rather large even when only the current context is selected for link installation.

The third and final option in the "Contexts" radio group 179 is to provide an explicit list of context dictionaries. A list of context dictionaries can be accumulated via browsing in the manner described above, or a list can be submitted dictionary-file format. Additional "virtual context dictionaries" may be defined by means of the Search function, with the search results forming a link subset which can be assigned a name and treated as a dictionary. It is preferable to offer convenient hierarchical browsing of the selected portion of context hierarchy represented by the dictionary list. Any search result may also be displayed as a dictionary file. Dictionary files are discussed more detail below.

Dictionary lists may be stored on the server in a directory devoted to each user or in a file with user's email address forming part of the filename, as shown in the example of FIG. 7. They may also be stored on the user's computer via browser cookies.

The "Min Level" 71 and "Max Level"72 pop-up lists allow specification of a range of educational levels for link installation.

While any number of properties may be associated with links, the top-level default submission form of FIG. 7 for link installation invites link selection according to only a few properties such as context 179 (determined by dictionary selections) and educational level 71,72. Installation specifications based on additional properties may be obtained by following the "Specify Additional Properties" link 174 and filling out a larger form allowing specification according to more criteria, using well known principles of database subset selection according record properties.

When the user presses the "Submit" button 173 (or the submit button of a long-form submission form), the server receives the filled-out form specifying how links are to be installed, processes the submitted text in a CGI Perl script or other server-side software to install the links, and generates output consisting of the user's submitted text with all the new links embedded.

Link Installation on the Server

Actual link installation from an aggregate dictionary by the server, while one of the more complex and resource-demanding operations, is based on well known database technology and methods in computer science for string search and replacement. The Perl language is well suited for this task.

In the preferred embodiment, an aggregate dictionary file is prepared on the server based on the user's link-installation specifications and the current contents of the server's link database. This dictionary file is then "applied" to the user's submitted documents in order to replace key phrases by hypertext links. A Perl script illustrating link installation for HTML files is included in Appendix A.

The preferable details of the methods used depend on the relative sizes of the files involved. For example, if stringent conditions are specified on link properties for installation, and if a large file is submitted from the user, it may be the case that the aggregate link dictionary is much smaller than the combined size of the files submitted for link installation. In this case, it may be fastest to search the submitted file for each link in the aggregate dictionary.

If, on the other hand, the number of eligible links is large (e.g., "All W3K contexts" was selected in the Contexts section 179 of the link installation form), and if the submission itself is small, it may be preferable to search the aggregate dictionary file for each possible key phrase in the input file using well known "incremental search" techniques.

In either case, if the user has specified that only emphasized words or phrases are to be linked, then all phrase boundaries are known, and this can be used to greatly reduce the computational burden of the string-matching task.

Single-Page Submission

For single-page text submitted using the HTML form of FIG. 7, the output HTML may be returned to the user in the form of a "dynamic Web page." That is, the user's browser immediately "navigates" to the automatically generated HTML page as if it were already somewhere on the Web. At that point, the user can select "Save As" in the Web browser in order to save the HTML in a local file, or "View Source" can be selected in the browser to enable copy/pasting of the generated HTML into a text editor for further editing.

Submission of an Entire Website

In an alternative mode of submission, shown in FIG. 7, the user specifies a URL pointing to the submitted document in place of the text of the submission itself. This mode of submission is more convenient for linking entire websites. In a typical configuration, the server processes the submitted file and all files reachable from the first via hyperlinks, provided that the reachable files reside somewhere on the same website (as defined by its URL). In other words, links are followed provided the first portion of the URL matches that of the submitted URL in its entirety.

In the case of URL submission, the processed document is not returned as dynamic HTML, but rather as a hyperlink to a single binary output file on the server containing all the processed files. This output file may be created by combining all processed files into one using the freely available tar program, and further compressed using the freely available gzip program. The tar and gzip programs are available from the GNU Free Software Foundation (http://www.gnu.org/). The output file can then be "downloaded" to the client computer by clicking on the hyperlink pointing to the output file in the dynamically generated HTML. The user then unpacks the file on his or her local computer using, e.g., gunzip and tar, or the shareware program WinZip. As a third alternative, preferred for large submissions or over slow internet connections, the user may specify the URL of a single composite file in "tarred and compressed" format, i.e., created using gnutar and gzip in the same way that the server's output is prepared in the case of multi-file submissions.

The filename extension is used by the link installation server to distinguish between pointers to websites (.html or no extension, indicating a directory) and compressed tar files (.tgz or .tar.gz). If the text appearing in the "Text or URL" textfield of the link-installation submission form starts with "http:", "ftp:", or "gopher:", a URL is assumed.

The following sections will describe further details of the operations indicated above.

Dictionary Search Order

Link installation usually occurs within a "current context" or a list of contexts. In the example described above, the current context may be set according to the location of the browser when "Install Links" was selected by the user. Alternatively, one or more contexts may be set explicitly in a dictionary list provided by the user when filling in the link installation form of FIG. 7.

In the simplest mode, the current context dictionary is searched first for matches in the user-supplied text, and matches are transformed into links. The process is "idempotent" since matches will not occur within the link syntax itself (such as in HTML anchor specifications or LaTeX macro arguments). As a result, dictionary entries are ordered from longest to shortest phrasings, as discussed above.

As described above, the dictionary for the current context is optionally augmented by the union of all lower-level dictionaries within that context. Current-level definitions take precedence over lower-level definitions in any key-phrase collisions. Collisions among lower level dictionaries are not explicitly arbitrated (since that could be accomplished by listing them explicitly), so that the first occurrence of a lower-level definition will take precedence (when not defined at the main level). This follows simply from the convention that "the first match wins".

The purpose of adding in all lower level directories is to provide a reasonably complete dictionary at a high-level node without having to duplicate definitions from lower-level contexts. In principle, such duplication could be avoided by moving all lower-level definitions to the highest possible context. As a simple example, the term "idempotent" is a math term used in many technical fields, and it is not an English-language term (according to the Funk & Wagnalls Standard Desk Dictionary). Therefore, "idempotent" can be defined without conflict in the top-level dictionary for the English language. In practice, however, it works out better to define terms in their "most natural" subcontext, and let their definitions "float up" as far as they can go without collision. Positioning a term within its "most appropriate" context makes the hierarchical dictionary better organized and instructive when browsing.

When an undesired definition is encountered, it can be "fixed" (the first time) by defining the term in the current context, since that will take precedence over all subcontexts and parent contexts. A conflict cannot occur in the current context (in principle) because a context is by definition a name space in which every term has a unique definition. Another solution is to list a specific ordering of lower-level dictionaries so that the first match is the desired one.

After the current-level dictionary is "applied", including all subcontexts, the parent node is normally next in the aggregate dictionary. It is searched for further matches, so that more general terms in the higher context not "overridden" by the lower contexts will be linked to their definitions. This process continues until the top-level context node is reached in the aggregate dictionary.

Note that it is not necessary to create an explicit aggregate dictionary. It is equivalent to instead apply context dictionaries sequentially in the proper order.

As mentioned above, a list of context dictionaries may be specified explicitly in a variety of ways. This is analogous to specifying multiple libraries when linking a computer program. The order of specification is important since the first match is taken. This feature may be used by specifying ancillary fields after the main field of the author. For example, a physics professor might include certain math contexts after the appropriate context(s) within the field of physics.

Maximizing Match Length in Key Phrase String Matching

As discussed above, there may be several forms of a key phrase ("synonyms") corresponding to the same URL. It is normally preferable to match the longest form present in the text so as to avoid multiple generic matches such as Taylor Series Expansion when there exists a longer match Taylor Series Expansion having a completely different meaning. Maximal-length matching is implemented in the preferred embodiment by maintaining the key phrases in order of longest to shortest and then traversing the dictionary in the prescribed order.

Contributing Links

Link submission support on the server enables all users to assist in the expansion of the "knowledge tree" represented by the link database dictionaries, and enables individual users to augment the link installation system to meet their special needs.

For example, a known user can contribute his or her own link database, select only it for search during link installation, and thereby obtain full control over the links which may be installed.

A personal link database can be very useful to the author of a book typeset in LaTeX, for example. Since LaTeX supports the generation of an index file, and since the freely available latex2html Perl script will convert a book index into an HTML page, such an index can be easily and automatically be converted (e.g., in the Emacs text editor) to a dictionary file format acceptable by the server. The entire book can then be processed by the server to install links pointing somewhere into the book for every occurrence of an indexed word in the book. Other links can of course also be included.

Another application of LaTeX index files is to merge the indexes of related books in order to generate a link database for a particular "field," spanning a specific set of resources.

Only known users can submit links and/or create subcontexts or key phrases. All submissions are "owned" by the submitting email address or groups defined by the submitting user. (Email addresses are verified by the authorization process described earlier.) Only the owner, group member, or server webmaster may make changes in submissions (except for their ratings and reviews, of course, which any known user can affect).

Since any number of users may be trying to submit link databases simultaneously, one of many known schemes for "file locking" is needed for the database files and directories during a submission. To avoid periods of database unavailability, submitted public databases can be first prepared in a temporary directory and extensively checked for correctness by the server, including owner checking, name-collision checking, URL validations, format checks, and so on. During this process, the eventual destination directory is preferably write-locked. Since final installation may be carried out by rapidly renaming the two directories, downtime for read access is minimized. Implementing link databases as many files distributed throughout a context directory tree makes database updates simpler, since updates in one context need not affect activities going on in other contexts.

Dictionary File Format

A link database (or dictionary list) may be submitted in a documented ASCII format supported by the server. Since all properties are optional, the submitted file can be as simple as a list of key phrases and their corresponding URLs. Below is a "dictionary file" which can be used to initialize a context hierarchy for the examples seen in the FIGS. 3–5:

```
GROUPS = CM_DSP
PATH = /Education/Technology
KEY = W3K
URL = http://www.w3k.org
#-------------------------------------------------
---
KEY = / Legal / GNU General Public License
URL = http://www.fsf.org/copyleft/gpl.html
#-------------------------------------------------
---
PATH = /Music/Computer_Music/Signal_Processing/People
```

-continued

```
KEY = Julius O. Smith III | Julius O. Smith | Julius Smith
URL = http://www-ccrma.stanford.edu/~jos/
KEY = JOS
URL = http://www-ccrma.stanford.edu/~jos/
#-------------------------------------------------
---
PATH = /Music/Computer_Music/Centers/CCRMA
KEY = CCRMA Courses
URL = http://www-ccrma.stanford.edu/CCRMA/Overview/courses.html
KEY = CCRMA Research
URL = http://www-ccrma.stanford.edu/CCRMA/Overview/research.html
KEY = CCRMA Overview
URL = http://www-ccrma.stanford.edu/CCRMA/Overview/Overview.html
KEY = CCRMA
URL = http://www-ccrma.stanford.edu/
#-------------------------------------------------
---
PATH = /Music/Computer_Music/Sound_Synthesis
SYNM = /Engineering/Signal_Processing/Sound_Synthesis
KEY = Lagrange Interpolation
URL = http://www-ccrma.stanford.edu/~jos/Lagrange_Interpolation.html
LEVEL = 12
KEY = Lagrange Interpolation
URL = http://www.acoustics.hut.fi/~vpv/publications/vesa_phd.html
KEY = Digital Waveguide Synthesis
URL = http://www-ccrma.stanford.edu/~jos/wg.html
KEY = Commuted Synthesis
URL = http://www-ccrma.stanford.edu/~jos/book2000/CommutedSynth.html
KEY = Virtual Analog Synthesis
URL = http://www-ccrma.stanford.edu/~jos/VirtualAnalog/VirtualAnalog.html
KEY = Physical Modeling Synthesis
URL = http://www-ccrma.stanford.edu/~jos/pmupd/PMSynthesis.html
#-------------------------------------------------
---
PATH = Music/Computer_Music/Signal_Processing/Sound_Synthesis/Vintage_Methods
KEY = Additive Synthesis
URL = http://www-ccrma.stanford.edu/~jos/SMS_PVC/AdditiveSynth.html
KEY = Sampling Synthesis
URL = http://www-ccrma.stanford.edu/~jos/samplingsynth.html
KEY = Cross-Synthesis
URL = http://www-ccrma.stanford.edu/~jos/crosssynth.html
#-------------------------------------------------
---
PATH=
Music/Computer_Music/Signal_Processing/Sound_Synthesis/
Acoustic_Instruments
KEY = Bowed String Synthesis
URL = http://www-ccrma.stanford.edu/~jos/book2000/Bowed_Strings.html
KEY = Brass Synthesis
URL = http://www-ccrma.stanford.edu/~jos/pmupd/Brasses.html
```

Several features of the ASCII dictionary format may be noted:

The GROUP directive lists the names of all groups which share ownership the submitted links. In this example, only one group, CM_DSP, is specified. Group specification is optional.

The PATH directive sets the default context for subsequent entries.

Anything after '#' is interpreted as a "comment" and ignored.

An entry can override the default path by including its own "absolute path" specification, as illustrated by the entry for the "GNU General Public License".

Path components are separated by '/' as is conventional in UNIX file systems. Spaces before and after a '/' are removed by the interpreter, and spaces within KEYs are converted to '_'. (Any number of adjacent "whitespace characters" are converted to a single '_'.)

The SYNM directive declares a synonym for the current default context. In this example, /Music/Computer_

Music/Sound_Synthesis is declared to be synonymous with /Engineering/Signal_Processing/Sound_Synthesis.

KEY synonyms may be declared in a single entry by separating them with vertical bars '|'.

KEY synonyms may also be created by specifying the same URL in two different entries (as in the JOS entry).

Order is important: The phrases "CCRMA Overview" and "CCRMA Research" will be transformed into links before the word "CCRMA", as a result of the ordering shown.

The only example of "competing definitions" in this dictionary is the case of "Lagrange Interpolation".

The first entry for "Lagrange Interpolation" is accompanied by an education level range specification using the LEVEL directive. It is set to 12 indicating that a high-school senior (at least one on the "math track") should be able to fully understand the main thrust of it. Alternatively, a minimum and maximum educational level could have been specified using the MIN_LEVEL and MAX_LEVEL directives. The arbitrarily set maximum value of 100 means "no maximum". Level ranges are more appropriate for "home pages" and the like which link to a variety of documents at a variety of educational levels.

Only trusted users can submit links and contexts wholesale in this manner to the link database server. However, any known user can submit such a set of links to a restricted or private directory. Otherwise, known users are allowed to submit one link at a time using the "Add a Resource" submission form described earlier.

If there are any pre-existing links in the same context directory with the same name and URL as a newly submitted link, the pre-existing link is retained unless the new submission is by the same owner. (Link properties could be updated or added in this manner, for example. Ratings and reviews are not affected since they may not be submitted in a dictionary file.) Rejected submissions are listed in a message from the server delivered in a dynamic web page, as is typical. Similar action is taken for other kinds of messages to the user as needed.

If the specified context directory does not exist, it is created, and the email address of the creating user is logged as its owner. The server automatically installs an encoding of the owner's email address in each link entry by means of an additional link property. Other properties, such as initial ratings, date-of-submission, etc., are installed by the server. Only the owner or group-member or server webmaster may modify an existing link or directory.

Similar submission protocols can perform editing operations which would otherwise be laborious over the browser-based user interface described above, such as deleting a database subdirectory and all its contents (provided, of course, that everything to be deleted is owned by the person or group making the request). For example, the directives DELETE_LINK /Physics/Quantum_Mechanics/Planck's_Constant DELETE_PATH /Physics/Quantum_Mechanics/Schroedinger's_Wave_Equation/ can be used in place of online interactive editing of the server link database. In general, there is preferably a script-style equivalent for all operations performable interactively via a graphical user interface such as Web browsers provide. In addition to performing the operations more quickly and conveniently, script-style alternative interfaces are very important for the visually impaired. Scripting also provides a means of conveniently resubmitting all links contributed by the user, thereby making it convenient for users to maintain "back-ups" of their submissions in a form that can be easily restored on the link-installation server. Browsing and Search features can be used to obtain a dictionary-file display of all links owned by the user.

There may be a limit placed on the number of database links and subdirectories that can be submitted by any one user (email address) or group. This is to guard against accidents, malicious "hacking," and to facilitate editorial tracking of contributed content. A certain amount of automatic checking for inappropriate content is possible, based on searching link targets for inappropriate words. Users can apply for "trusted" status by sending email to the server webmaster or other authorized agent. Trusted users may be given a higher contribution limit and perhaps also a higher weighting in link ratings. A group of users can be formed in which each member is trusted within that group.

Use of Dictionary File Format to Specify Context Lists and Dictionary Lists

When specifying a list of context dictionaries for link installation, it is convenient to be able to use dictionary file format. When used in this way, all PATH directives in the file are extracted to form a list of contexts. If any link sare specified for a particular context PATH, then only those links will be eligible for installation. Additional directives are provided which correspond to the options available for context dictionary specification, such as include parents, include subcontexts, and allow multiple inheritance. For convenience, these aggregate-dictionary-building directives are ignored when submitting a dictionary file as a means of submitting links.

Using the previous example dictionary file now to specify an aggregate dictionary for link installation gives results equivalent to the following dictionary file:

```
GROUPS = CM_DSP # Only operative if selecting based on group
PATH = /Education/Technology
PATH = /Music/Computer_Music/Signal processing/People
PATH = /Music/Computer_Music/Centers/CCRMA
PATH = /Music/Computer_Music/Sound_Synthesis
SYNM = /Engineering/Signal_Processing/Sound_Synthesis
PATH = Music/Computer_Music/Signal Processing/
   Sound_Synthesis/Vintage_Methods
PATH=
   Music/Computer_Music/Signal_Processing/Sound_Synthesis/
   Acoustic_Instruments
```
Adding some typical directives and eliminating one redundant specification leads to
```
GROUPS = CM_DSP # Only operative if selecting based on group
PATH = /Music/Computer_Music
MULTIPLE_INHERITANCE_DEPTH = 2
OWNERS_ONLY
MIN_LEVEL = 12
MAX_LEVEL = 100
SUITABILITY = PG-13 # Movie and V-chip names understood
SOURCE = ALL
TYPE = Refereed
PATH = /Education/Technology
```

Several features of this aggregate-dictionary specification may be noted:

MULTIPLE_INHERITANCE_DEPTH=1 means that the context dictionaries of linked parents are appended to the aggregate dictionary for context synonyms occurring 1 level below the current context or less. This is just sufficient to pick up the "engineering parents" of context Sound_Synthesis without also including linked parents of lower levels.

The OWNERS_ONLY directive restricts the aggregate dictionary to links owned by members of group CM_DSP.

The minimum and maximum educational level restrict link installation to links rated at $12^{th}$ grade or higher.

Source "ALL" means any source. Other choices include EDUCATIONAL (.edu), COMMERCIAL (.com), and so on. As usual, multiple sources can be separated by vertical bar '|'.

The TYPE is resource type. "Refereed" is a symbol for all refereed source types (journal article, book, etc.) If no type was specified by the contributor, it is UNKNOWN.

Order is important: The listed contexts will be appended in the order given, with the first one listed being considered the "current context".

Dictionary combining directives as shown in this example are "sticky", meaning that they apply also to subsequently listed context paths unless they are explicitly reset, or set to "NIL" indicating no value (to obtain the system default behavior).

Security Considerations

The IP address is stored as well as the verified email address for security reasons. A user with "root privileges" on a personal machine can generate any number of return email addresses, while the number of IP addresses available to an individual is usually very limited. For example, if unusually many email addresses are found to belong the same IP address, a warning can be automatically emailed to the webmaster who can look into the matter further, such as by inspecting all contributions from that IP address. If an IP address turns out to belong to a malicious "hacker", it is straightforward using standard UNIX tools to eliminate all database entries and directories associated with that IP address, barring it from further contributions, and so on. When the IP address is dynamic, as is often the case when a commercial Internet Service Provider (ISP) hosts the user's account, it is less likely that many different email addresses will belong to the same person, and the ISP can be contacted for assistance. Note that it is very easy to arbitrarily set the "From:" field in any email message; therefore, the "Received" fields in received email may be analyzed by the server to get closer to the true originating location. In Netscape Navigator, for example, select "View/Headers/All" to see such fields in received email.

Link Database Implementation

Each link database may be implemented on the server as a plain ASCII file in a directory structure that corresponds to the hierarchical organization of the link databases.

The complete hierarchy can also be implemented in a single file which contains path information for each link entry. The initial prototype of the present invention used a single link database file based on the links-2.0 software scripts from Gossamer Threads, Inc. (http://www.gossamer-threads.com/scripts/links/). In this implementation, the context path information is included in what is called a "link category". In adapting the links-2.0 scripts, categories having no sub-categories are considered to be "key phrases", and actual links within a key-phrase (bottom-level category) are treated as "competing definitions".

For a variety of reasons, use of a single links database file is not considered the best mode of carrying out the present invention. Instead, a hierarchical file system implementation is preferred in which the directory path corresponds to the context, and the database file in a context directory contains only links for that context (along with perhaps a limited number of subcontexts).

Alternatively, an evolutionary path can be followed starting out with a single database file, followed by splitting into separate database files for top-level contexts, followed by further splits as the files grow too large, etc. (The links-2.0 system advises a limit of 10,000 links for its one-file link database system managed by Perl CGI scripts.) On each split, the first path component stored in the link database may be removed since it becomes implied by the directory in which the database file resides.

A database directory may contain both files and directories. Subdirectories are interpreted as subtopics, and the hypertext links for the current directory (when it is a key-phrase directory) may reside within a single ASCII file named "links.txt", for example, preferably located in a context directory containing the key phrase. The links.txt file contains a list of hypertext links for the current context in a plain ASCII format described below.

There may be a temporary "system file" for each active user which lists current selections and other state information pertaining to that user. Multiple selection configurations may be stored on client computers by means of the "cookie" mechanism supported by the major Web browsers. The name of a user's configuration file may include the user's email address, if known, and otherwise an arbitrarily assigned session ID for "unknown" users. All active sessions preferably time out after a period of inactivity, as is commonly implemented by websites featuring session management.

There may be a system file ratings.txt, parallel to links.txt in each directory, containing all contributed ratings for the links in links.txt. Information stored in ratings.txt for each link includes the email address of each contributor, and the contributed rating. When a new rating is contributed, an entry is appended to ratings.txt. If there is already a rating from that email address, it is replaced with the new one. A new average rating is computed, and the updated average rating and contributor count are entered into links.txt as properties for the affected link.

Another system file, reviews.txt, also parallel to links.txt, resides in each directory and contains all contributed "link reviews". Information stored for each link includes the email address of each contributor, and the contributed review. When a new review is contributed, it is appended to reviews.txt, replacing any previous review from that email address.

Link Database Details

Links may be stored on the server in the following simple ASCII text-file format:

```
ID | KEY | URL | PropertyName:Value | PropertyName:Value | . . .
ID | KEY | URL | PropertyName:Value | PropertyName:Value | . . .
. . .
```

This format uses explicit property names which are convenient when specifying sparse subsets of all possible properties (and also more clear for describing the invention). An alternative is the use of a fixed-format record in which the property names are implied by their field position within the record.

The ID is a unique integer assigned to the database record. The ID therefore uniquely identifies the record and can be used to identify it in various contexts, such as in the URL for indirect links.

For example, a link to a Web page about the "W3K" website could appear in the link database (in one long line which is broken for clarity below) as

```
23 | W3K | http://www.w3k.org | Date:2-Sep-99 |
     Context : /Education/Technology/W3K |
     Level:All | Rating:5 | RatingCount:7 |
     Hits: 20 | Installs: 4 |
     Owner : Julius Smith |
     Group : CM_DSP |
     OwnerEmail : jos@w3k.org
```

In addition to link databases, there is preferably a user database holding information such as a list of IP addresses authorized for that email address, whether the user wants to receive the W3K newsletter, the list of groups to which the user belongs (being a "trusted user" means belonging to the "trusted" group), and information logging any inappropriate use of the service such as submitting offensive links. (See the system for dealing with "trolls" at http://www.slashdot.org for an example system.)

Example Link Properties

Example PropertyNames and their meanings are as follows:

TABLE 3

| Property | Meaning |
|---|---|
| Level | Educational level of the link, if not a range (1–100, All) |
| MinLevel | Lower bound of educational level range, if applicable |
| MaxLevel | Upper bound of educational level range, if applicable |
| FullTitle | Contents of URL's HTML <TITLE> tag in quoted string |
| Description | Description of link by submitting user |
| Date | Date link was submitted by user |
| Type | Type of information (Encyclopedia, Tutorial, Book, Course, . . . |
| Language | English, French, German, Spanish, . . . |
| Suitability | Similar to rating system used in the "V chip" for television |
| Context | Context path (when handling many contexts per database file) |
| Synonyms | List of equivalent phrases separated by '|'. Order is important. |
| Hits | Number of times link accessed by browsing |
| Installs | Number of documents link has been installed in |
| Rating | Quality rating as a number from 1 to 10 |
| RateCount | Number of users contributing ratings |
| isNew | 1 if Date is sufficiently recent |
| isPopular | 1 if Hits is large relative to other links |
| OwnerEmail | Email address of link contributor |
| ReceiveMail | 1 if link contributor wants our newsletter |
| Groups | List of owning groups separated by '|' |
| User1 | Property defined by user |
| User2 | Property defined by user |
| . . . | . . . |

The properties can be used to limit the range of links installed by a link installation. For example, a certain educational level range can be specified, or links only of a certain type may be specified. Restriction to links contributed by the owner or owning group is also easily specified.

KEYs will match occurrences of any case by default. When a link is installed in a user's document, the user's original case is preserved in the anchor text. KEYs may be entered in singular form since the string matching algorithm will match will ignore a trailing 's'. A KEY is either a simple word or a phrase consisting of words separated by underbars, e.g., Funk_&_Wagnalls_Knowledge_Center. A word may not contain certain "meta-characters" such as "|" or "#" which have system meanings, and all such meta-characters are stripped out by a regular expression (in Perl) on input. Similarly, context names must be "legal" UNIX file names after whitespace has been converted to underbars '_', since the preferred embodiment uses a UNIX directory tree corresponding to at least part the context hierarchy. Restriction to legal filenames is easily relaxed by encoding the directory names in hexadecimal, as an example, or using the special character encodings of HTML. The string matching algorithm used in link installation "folds" the input case to "lower" and replaces underbars and hyphen with spaces in string comparisons. As a result, KEYs in text submitted for link installation can have any case and can include underbars, hyphens, or spaces separating words in the keyword phrases, yielding the same matching results in all such cases. In the above example, the link name is functionally equivalent "funk wagnalls knowledge center" for purposes of string matching. To include special characters where necessary, names may be quoted, as in 'Funk & Wagnalls Knowledge Center'

In the case of quoted names, string-matching is exact. Other details regarding string matching for link installation may be seen in the example of Appendix A.

Single-computer Implementation

The present invention can be adapted equally well to single-computer operation, requiring no network connection. In this case, the user can install a link database application from a CD-ROM, for example, in the fashion typical of many software products for personal computers. All functions formerly described as being provided by a Web browser and the remote link-installation and database server can be provided by the installed application. A Web version, if available, can serve to provide a supplementary collection of links.

There are several advantages to this mode of operation:

Since all data and software are local, response time can be greatly improved relative to use over the Internet.

A link database application may take advantage of native graphical user interface (GUI) facilities on the personal computer, which are typically more advanced than the platform-independent HTML and Web-browser facilities.

Since link database extensions may occur on the local hard disk instead of on a remote website, security requirements are alleviated, and user privacy is enhanced, especially for "private" database directories.

The link databases are not constantly changing, particularly the ratings, thereby automatically giving repeatable results on repeated link installations.

The link databases can be customized by manually setting alternative link orderings, and eliminating unwanted alternative links.

The following implementation differences apply to the single-computer embodiment:

Instead of one master link database directory, there may be two parallel link database directory trees having a common directory structure. The first may be "read only" so that it can be distributed and used on a CD-ROM, for example, while the second is "writable" and contains any, user-developed databases, as well as the temporary "system files" generated during use of the system. The writable directory tree will normally reside on a local hard disk.

In operation, the writable directory is searched first so that it takes precedence over the read-only directory, Logically, the links.txt files in the writable and read-only directory images are treated as one file, with the read-only version being appended to the writable version.

Links on the CD-ROM may be "deleted" by adding a corresponding entry for them in the writable directory tree consisting of exactly the same keyword or phrase, the same URL, and the single property "DELETED". Read-only directories cannot be deleted or renamed, but they can be excluded from link searches in the normal way (which applies also to the corresponding directory in the writable tree, if any, since they are logically the same directory).

Link database updates may be obtained over the Internet and installed locally to keep the single-computer software up to date. To facilitate this process, it is convenient to maintain on the server listings of database directories and contents for each software release. During an update, the server can traverse the link database directory, compare against the listing applicable to the user's current release, and generate an incremental update to bring the user up to the latest state. The incremental update is installed in the writable database directory on the user's local computer, automatically shadowing any older corresponding information on the CD-ROM. Updates may be obtained at any time to obtain the latest links. Information can be stored locally on the user's machine to enable each update to be incremental relative to the previous update as opposed to the latest official release.

URLs submitted in the "Text or URL" textfield of the link-installation submission form may also include "file:" type URLs.

It may occur that the user has locally extended the link database in a way that conflicts with the server's extensions since the time, of the user's release or last update. The directory path, keyword or phrase, and URL all have to be identical to create a link conflict, and so actual conflicts can only occur in link properties. Link rankings can of course change at any time, and this is normal. However, since locally installed ranking information may be a rating override by the user (rather than the result of a previous upgrade), it is not necessarily correct to overwrite the locally installed rating properties. Similarly, other properties may have been added by the user to fine tune link installation results. During installation of the incremental update, the user may be given a choice of whether or not to accept conflicting information from the incremental update on a link by link, or property by property basis. The default action may of course be to avoid overwriting any user-developed information, and the default upgrade can proceed in this mode. In the default mode, all conflicting links can be installed in a third parallel directory tree for later inspection by the user. Another means for avoiding conflicts is to rename any pre-existing directories containing user modifications (by adding a private suffix to its directory name, say) before carrying out an update.

Educational Levels

The educational level of a definition is a number indicating how advanced the material is. Authors generally wish to minimize the educational level as much as possible consistent with the intended audience, the material being presented, and the desired length of the document.

Every definition (link) is assigned an educational level. A normalized educational level may be provided manually by the link contributor as a number between 0 and 100, with the number being loosely interpreted as "years of education likely required", for someone specializing in the subject. When no manual assignment is made by the link contributor, a level is automatically computed which interpolates the manually assigned levels that do exist.

Automatic Assignment of Educational Levels

The automatically assigned level of a definition is computed by first computing an integer "raw level" for the definition based purely on an analysis of definition interdependencies, followed by the computation and assignment of a "normalized level" which maps each raw level to the pre-existing manually assigned level when it exists.

The raw educational level is defined as 1 plus the maximum raw educational level of all referenced definitions, where a definition referencing no other definitions is assigned a raw level of 1. A referenced definition here means any server-resident link occurring inside the definition's document. All links outside the server are assigned a level of zero (to avoid having to process external documents, all their sublinks, etc., in a potentially huge recursion over the internet). In a definition document which refers only to outside material, which would receive an automatically assigned raw level of 1, it is the submitting author's responsibility to reasonably assign its educational level manually when submitting it to the server. Forward references in a document can be marked as such to prevent them from artificially elevating the automatically computed level.

In the preceding paragraph, a "definition document" means the page pointed to by the definition's URL together with all information reachable from the definition page on the same website by following links. Thus, as an example, the definition document corresponding to definition URL http://www.w3k.org/ includes the contents of http://www.w3k.orgl/index.html together with any HTML (or other format) content reachable by following links within index.html, such as http://www.w3k.org/about.html, which are at the same site, that is, expressible using URLs starting with http://www.w3k.org/.

In addition to setting an appropriate educational level when possible, documents may mention any specific recommended prerequisites at the outset, providing links whenever possible, so as to better orient the reader. The often-used "list of keywords" appearing below an article's abstract, after being automatically linked by the present invention, can provide a good first set of background links. However, an explicit list of prerequisite topics, automatically linked to top-ranked tutorials by the present invention, can provide a more systematic and preferable approach to prerequisites.

Normalizing Numerical Educational Levels

Educational levels are normalized to make them more intuitive to use. Normalization is a process which recomputes automatically assigned educational levels so as to make them fit more naturally among the manually assigned levels.

Raw numerical levels are integers which are bounded below by 0 and unbounded above. The raw level of any document is at least 1 greater than the maximum level among all documents it references. As automatic level assignment proceeds through a large collection of documents, levels of advanced writings can tend toward very large integers. As a result, the raw level number is difficult to interpret. Normalization can be easily accomplished using a piecewise-linear mapping from the raw-level scale to some "standard level" scale.

The standard level scale used at the server may be loosely based on the number of years of education "likely required" to understand the document for someone taking a direct educational route to the material in the given context. It is analogous to a "par score" in golf, which defines the average number of "strokes" required to complete the course, for a good player. Such a numbering scheme obviously becomes more and more debatable at levels above 14 or so (middle undergraduate level) where curricula are not uniformly standardized. In fact, it is common in many technical fields to constantly work toward moving level 17 materials (beginning graduate level) down to level 14 or even below, meaning the "ideal" educational level is itself a moving target.

A nominal listing of normalized educational levels is given in the following table:

TABLE 4

| Numerical Range | Named Range |
|---|---|
| 0–1 | Preschool to 1st grade |
| 1–2 | 1st to 2nd grade |
| 2–3 | 2nd to 3rd grade |
| 3–4 | 3rd grade |
| 4–5 | 4th grade |
| ... | ... |
| 12–13 | 12th grade |
| 13–14 | College Freshman |
| 16–17 | College Senior |
| 17–18 | 1st year graduate student |
| 20–21 | 4th year graduate student |
| ... | ... |
| 100 | Arbitrary maximum level |

To find the nonlinear mapping necessary for level normalization, certain documents need to be assigned a "known standard level", such as "8$^{th}$ grade." An obvious choice for such documents would be those occurring in actual standardized courseware. A few such documents spread out between zero and the maximum level are sufficient, but preferably there is at least one per year, to make the mapping reasonably accurate. With this information, a piecewise-linear mapping from raw level to standard level can be constructed which takes the automatically computed levels of the known-standard-level documents to their known standard levels. Thus, the piecewise linear mapping will have "break-points" at the level of each standard-level document.

For purposes of level normalization, a definition can be schematically represented by a list of numbers (the raw levels of all referenced definitions) to which a higher number must be assigned (the definition's raw level). For example, two definitions D1 and D2 might appear schematically in this way as follows:

D1(20): 13, 14, 18, 19

D2(19): 17, 14, 18

Here, the number in parentheses (20, for Definition 1) is the definition's level, while the numbers following the colon ':' give the levels of all referenced definitions, not including forward references.

To keep track of the specific definitions providing each referenced level, let's extend the above notation to include definition number:

D80 (20): D2 (13), D5 (14), D44 (18), D45 (19)

D81 (19): D9 (17), D5 (14), D44 (18)

Thus, in this example, definition node 80 is assigned a raw educational level of 20 which is consistent with the fact that its document references definitions 2, 5, 44, and 45 which have been assigned raw levels 13, 14, 18, and 19; respectively.

Forming A Directed Graph Expressing Educational Level Relations

From the above data structure, it is now straightforward to form a directed graph in which each node of the graph corresponds to a definition, and a reference to another definition can be visualized as an arrow (also called an "edge" of the graph) pointing from the referencing node to the referenced node. (The arrows can alternatively be taken to all point in the other direction, from the referenced node to the referencing node.)

The problem of assigning consistent educational levels can now be seen to be equivalent to the general problem of ordering the nodes of a directed graph so that every path through the graph traverses nodes in a monotonic numerical order. This type of ordering is known as a topological sort, and there are standard algorithms in computer science, such as Dijkstra's algorithm, for this purpose.

Resolving Cycles

It is well known that a directed graph can be topologically sorted if and only if it is acyclic, meaning there are no cycles in the graph. Standard topological sorting algorithms just work when there are no cycles, and when there are cycles, they are detected and reported as errors, leaving it to the user to "break the cycle" in some way.

Cycles can be caused inadvertently in documents by use of forward references. For example, in a level 12 document about the calculus, it would be quite natural to mention some calculus applications such as solving problems in elementary mechanics (which is level 13 at a typical university, requiring calculus as a prerequisite). To address this problem, a mechanism is provided for authors to mark forward references in documents, so that forward-reference links are ignored in the computation of educational level.

Algorithm for Educational Level Assignment

An algorithm for educational level assignment can now be described as follows:

1. A directed graph is constructed by traversing all definition nodes and building a tree in which each node contains a list of pointers to other nodes. Each node corresponds to a definition, and each pointer points to a referenced definition. Let the definition nodes be arbitrarily numbered from 1 to N. This will be called the "lexical ordering" of the nodes, and it need not change.

2. Using a topological sort algorithm on the directed graph, each node is assigned a second integer corresponding to its "raw educational level. Nodes having no references (no "incoming arrows") are assigned a raw level of 1. A node having one or more references is assigned a raw level at least 1 greater than the raw level of all referenced nodes. (Manual assignments used for normalization are ignored during the topological sort.)

3. Use the raw level assignments together with the manually assigned normalized levels to construct a piecewise-linear mapping from raw to normalized educational level for all nodes.

A Perl program implementing the above steps is given in Appendix D.

Non-Monotonic Manual Level Assignments

There is nothing in the system to prevent manually assigned educational levels from being "out of order" relative to the raw assigned levels. For example, suppose document A has a raw level of 200, while document B, which references document A either directly or indirectly, has a raw level of 250. Suppose further that document A has a manually assigned level of 40 while document B has a manually assigned level of 30. Since the manual ordering is the opposite of the reference-based ordering, a conflict occurs, and the piecewise linear map which takes raw to normalized levels will have a segment with negative slope, which doesn't make sense.

There are several possible ways to address this issue:

0. The manual assignments can be forced to be monotonic by adjusting them so that the minimum piecewise-linear mapping slope is zero (or some small positive number). In the above example, the normalized level of B could simply be thrown out on the simple grounds that since B references A, it is by definition at a higher level, so that its manual level cannot be allowed to be set lower than that of A. It could alternatively be set to the same level as A. A could also be compared with other documents at comparable raw levels to see if its manually set level is unusually high, and, if so, it can be rejected as an "outlier". The automatic normalization system does not need many manually set levels, so it is preferable practice to throw out any that seem suspect for any reason.

1. Manual level assignments can be allowed only for values up to, say, 18, forcing all higher levels to be extrapolated via automatic assignment. Extrapolation may be determined by normalizing the highest raw level to 100, and other values would function as well. Alternatively, the slope of the mapping leading up to normalized level 18 can be estimated, and higher raw levels can be normalized to preserve this slope.
2. A slightly more sophisticated version of the previous solution is to "fit a monotonic curve" through the manual level assignments. To see how this works, plot N(i) versus R(i) in the Cartesian plane for all i, where i ranges over all definition links in the system, R(i) is the raw level assigned to definition i, and N(i) is the normalized level manually assigned to definition i, if any. If N(i) is not assigned, do not plot the point. Since there can be any number of documents with the same raw level R(i), there may be many values of N(i) for a given value of R(i) as i ranges over all links in the database. For each R, a range of normalized values may be covered by N. Such a plot of N versus R can be called a "scatter plot." For simplicity, suppose both R and N are normalized to range between 0 and 1, so that the plot of N versus R in the,Cartesian plane starts at (0,0) and terminates at (1,1). Ideally, this distribution of points in the plane will resemble a blurry line at a 45-degree angle (or perhaps a concave or convex curve instead of a straight line, etc.). Well known curve fitting methods, such as linear regression, cubic splines, Bezier curves, and least-squares polynomial fitting can be used to fit a monotonic curve through the "scatter-plot" of N versus R.
3. A more refined version of the previous solution is to replace the 2D scatter plot by a 3D histogram. As in the 2D case, the horizontal axis is R and the vertical axis is N in the plane; however, the third dimension for each plane coordinate (N,R) is now the "number of definitions having manual level N and raw level R". The scatter plot resembling a blurry monotonic planar curve in the previous solution now becomes a raised histogram following the same curve. However, the third dimension allows seeing where "most" of the manual ratings lie, and a curve-fitting procedure can try to "follow the ridge" in the histogram. There are numerous curve fitting and "hill climbing" methods known those skilled in the art that would be straightforward to apply here.
4. Certain manual level assignments can be given priority over others, such as those produced by an educational standards body, educational institution, or professional society. Deferring to these assignments in the event of a conflict may resolve it in some cases.
5. An expert in the field can study the level assignments and make a recommendation for reassignment of the manual normalized levels as seems right.

In any case, when a manually set normalized level is thrown out or reassigned, the owner of the modified link record is preferably notified via email. In the current preferred embodiment, the combination of solutions 0 and 1 is employed, but more sophisticated solutions are anticipated to become preferable as the link database grows.

It is informative for users to see a histogram of the number of documents having a certain normalized level versus normalized level. Such a histogram can indicate to users how significantly the number of links installed will change as the minimum and/or maximum educational level are adjusted.

Educational Levels as Context Limiters

Note that level assignment helps to disambiguate between relatively advanced and elementary contexts. In one actual example encountered by the author, the proof of "Euler's theorem" contained the use of the phrase "positive real number." The term "positive real" existed in the dictionary for the same context, but at a much more advanced level. (It was entered as short for "positive real function" which is a mathematical property of functions in the complex plane characterizing "passive" driving-point impedances in the context /Engineering/Electrical/Classical_Circuit_Theory). Since links to higher educational levels are normally suppressed when installing links, the misleading link would not occur. Other solutions to this problem include (1) requiring the whole phrase "positive real functions" for a match with the more advanced topic, (2) splitting contexts so as to separate elementary complex variables and more advanced network theory, and (3) supplying a trivial home page for "positive real number" which then would shadow "positive real" in this case.

Context Dependency of Educational Levels

Since a link to a particular document may be repeated in any number of contexts, its manually assigned educational level may be a function of the field associated with that context (such as a high-level parent context). For example, in an engineering curriculum, study of the "phase vocoder" (a tool for "stretching" sound in time, among other uses) can easily occur at normalized level 16 (a college senior with a good undergraduate background in signal processing). On the other hand, within a computer music graduate curriculum, the "phase vocoder" topic may be set at level 18 or 19 so that the Music Ph.D. student has time to pick up necessary signal processing prerequisites in the electrical engineering department. (In the golf analogy, 16 is "par", while non-engineering majors ("less experienced players") may receive a 2 or 3 stroke "handicap".) When levels are fine-tuned in this way, the relevant "context synonyms" previously described may need to be broken. For automatic level assignments to follow context-sensitive normalized levels, it is necessary for documents to either specify the context of the link (as described below), or provide the context of the document containing the link, such as is easily provided in HTML "metadata". In summary, a single document may have a different normalized educational level assigned to it in different contexts.

A convention for handling multidisciplinary documents can be that the level of the document is set according to the portion of the document which properly belongs in the context to which it is assigned. A document requiring expertise in three fields, say, could then receive three different levels, one in each context, where the level in each case depends only on the portion of the document pertaining to that field. As an example, consider a paper on the legal issues of patenting genetically engineered life forms; the paper can be placed in the context hierarchy in at least two places, under /Legal/Patents, and under /Science/Biology/Genetic_Engineering (which, by the way, could be synonymous with /Engineering/Genetic_Engineering). Under /Legal/Patents, its level is set according to the level of legal background required. Under /Science/Biology, its level is set according to the level of knowledge required to understand the technical aspects of the article.

Since link properties can be added by the user, the above example can be extended to include a secondary level specification. For example, when filing the paper under /Legal/Patents, it can be given two additional user-defined properties SecondaryContext: /Science/Biology SecondaryLevel: 14 and the filing of a link to the paper under /Science/Biology/Genetic_Engineering can have the two extra properties SecondaryContext: /Legal/Patents SecondaryLevel: 16 for example.

An alternative mode of treatment for multidisciplinary or cross-disciplinary documents is to assign a manual level to the document which represents the number of years of education likely required for understanding assuming one first obtains a typical background in the current context. That way, the level numbers of links in a particular field are most meaningful for people in that field. Since people in the field are most likely to be using the links for that field, it makes sense for the numbers to be best adapted to their needs.

The system of the present invention allows for many choices of normalized level scale, and the scale can be changed at any time by resetting the manually set levels. A link contributor may, for example, perform a property-based link database search which collects together all editable links at a particular educational level, and changes all the levels to a new value in one edit operation on the selected set.

Example of a Very High Educational Level

To A specific example of a particularly high educational level is "superstring theory" which is a current "hot topic" in theoretical physics. Understanding a recent conference paper on this topic might require several prior recent papers to be read and understood, and these in turn might require the equivalent of a basic textbook on superstring theory, which would require a solid grounding in quantum field theory, which requires a basic quantum mechanics background, which requires a few years of physics and math at the college level, and so on. It is debatable how long it should take a "good student" to get through such a path of study in order fully grasp the end concepts, but this question can be decided by educators and professional societies. Since normalized educational levels are ultimately determined by manual assignment, the automatic assignment system will conform to their decisions.

Curricula "Critical Path" Identification and "Education On Demand"

As educational curricula become "finer grained", the normalized educational level numbers may go down over time as shorter and shorter "critical paths" to particular advanced topics are identified. Curricula can in fact be based precisely on such identified paths, or even automatically generated from them. This is a foreseeable use of the present invention. Specifically, a student can choose a set of skills and topics he or she wishes to master, and plunge in immediately on the most advanced level, clicking on links whenever a word or phrase is not understood. After enough clicks, a level is reached where the material is digestible, and the student can eventually work back up to the desired level. This is in contrast to the usual program of beginning with elementary preliminaries which can seem unmotivated to the student. Needed educational prerequisites can be "paged in" as needed on a demand-driven basis (to use an analogy with "demand paging" in computer science). Significantly, unnecessary educational prerequisites can be bypassed entirely.

Demand-driven education can be more motivating to students prefer to work with an end goal in sight. Since everything studied is motivated by an attempt to understand a more advanced document which accomplishes a tangible desired goal (such as "stretching" sound without changing its pitch in the case of the phase vocoder), it can always be clear to the student, for example, "what is this for," and "how are we going to use this." It further provides a "natural selection mechanism" for educational materials, omitting required study of anything not needed to fathom the specifically chosen advanced materials on the desired track.

Application to Automatic Teaching and Certification

In a computer-assisted curriculum along these lines, the student may have to answer exam questions at the end of each document which serve to verify and reinforce the student's understanding. In the end, a course of study could result in a collection of automatically generated certificates for the topics covered, and job requirements could be stated in terms of certification levels on specific topics. There are obvious issues associated with proctoring exams in such a system, but there exist traditional solutions as well as more novel technological solutions using, say, a simple camera attached to the computer with a viewing angle large enough to include the keyboard.

Such a mechanized approach to self-paced educational certification has a few obvious disadvantages relative to more traditional educational methods, especially given the limited "virtual reality" capabilities of present day computers. However, it can provide a very efficient way to "tool up" on a technical topic, particularly for the time-limited employee, the spare-time student, or the bright young learner in a developing country seeking salable job skills in the global information economy.

Preferred Link Targets

Preferably, each concept is given its own "home page" on the Web which approaches the subject in a top-down way, addressing the widest possible audience, and directing all interested readers to the most appropriate further information for them. All-encompassing home-page style definitions are likely to emerge as the "best definition" in a user-ranked list. Being designated the "best definition" for a topic is significant in that, in some modes of operation, only the "best" definition is available to the end user in installed links.

Example "topic home pages" include one on the Kalman filter at http://www.cs.unc.edu/~welch/kalmanLinks.html and the "Digital Audio Resampling Home Page" located at http://www-ccrma.stanford.edu/~jos/resample/

Another advantage of top-down, general-interest, home pages on a given topic is that its minimum educational level may be set low, allowing the link to be installed in a greater variety of materials, while the expert can skip over the introductory tutorials and proceed directly to the mode advanced material of interest. For this reason, the preferred embodiment supports specifying a range of educational levels for a single document. A well designed topic home page might span levels from high-school all the way out to the research frontier. An example website covering such a large range (although not devoted to a single topic) is the Physics 2000 website at http://www.Colorado.EDU/physics/2000/

Generatng Link Targets in a Uniform Format

A useful means for generating link targets is to write a LaTeX document which explains one "concept" per section. The title of the section may be the word or phrase being defined. The first occurrence of the concept's name may be emphasized using the LaTeX command \emph{}). The utility latex2html can then be used in a normal fashion on such a "concepts file" to create a separate HTML file for each section, and the hypertext index generation capability of latex2html can be used to generate the associated link database (dictionary file). Alternatively, a dictionary can be generated directly from the HTML using the widely available Perl modules LWP and HTML (see, for example, the Perl Cookbook by T. Christiansen and N. Torkington, O'Reilly, 1998). A Perl script for this purpose is listed in Appendix B. The dictionary file so generated may be submitted to the link database server to conveniently contribute links to all the newly created concept home pages on the Web. (The script is written to retrieve all files under a URL by following links, thereby providing a starting point for a utility which creates a dictionary file from any website on the Web.)

The LaTeX command\section{} can be replaced by an invocation of the following more convenient macro:

\newcommand{\ConceptSection}[2]{
  \section{#1}
  \index{#1)
  \begin{htmlonly}
  \rawhtml{<!—W3K_PROPERTIES: '#1'#2—>}
  \end{htmlonly}
}

This macro is called with the section name as usual, but additional properties may be specified in the second argument, and these are passed to the output in an HTML comment which may be interpreted by the script which creates a dictionary file from the HTML files (a starting point is given in Appendix B). (A more elegant solution, feasible when XML is widely supported by Web browsers, is to define an XML tag for each link property.) Context properties found in the HTML comments may be translated to PATH directives in the dictionary file. An alternative use of properties embedded in link target files is that, when using indirect links, link properties do not have to be included in the link database at the link server.

As an example, a new section could begin as follows:

\ConceptSection{Derivative}{Level:12
  Context: /Mathematics
  Synonyms:Differentiation}{
  The \emph{derivative} with respect to $x$ of the continuous function $f(x)$ is defined by the \emph{limit}...
} and a related example might be

\ConceptSection{Derivative}{Level:11 Context:/ Financial/Investing}{
  A \emph{derivative} is a financial instrument derived from an underlying security such as ...
}

Note how the use of the Context property can be extremely important for obtaining the desired results. If the Context property is not specified for a link, it may default to the path of the database directory in which the link resides. The Context value All can be specified in a link entry by trusted users to enforce only one meaning of a term across all Contexts. Such treatment could be appropriate for trademarks, for example. Since the top level of the link database directory tree is Context independent, link entry at that level can be restricted to trusted users.

Guiding Link References

In the previous example, properties were used to specify the context and educational level of a link target. Properties can similarly be specified in documents submitted for link installation in order to guide link installation. Thus, the document receiving links can call for links of a certain type rather than having to specify all aspects of link installation in a separate script or over the browser interface at the server.

As an example, in a document using the term "derivative," the context may be specified as follows:

The \kref{derivative}{Context:/Mathematics}with respect to $x$ of the continuous function $f(x)$ ...

where the kref macro might be defined along the following lines:

\newcommand{\kref}[2]{
  \emph{#1}
  \begin{htmlonly}
  \rawhtml{<!—W3K_PROPERTIES: '#1'#2—>}
  \end{htmlonly}
}

A linked reference can be marked as a "forward reference", for example, via

The \kref{derivative}{Context:/Mathematics Forward-Reference} with respect to $x$ of the continuous function $f(x)$ ...

in order to avoid having it affect the educational level of the current document. While these examples pertain to LaTeX submission format, preparation of plain HTML submissions is specified implicitly as well, since LaTeX is compiled into HTML in this application.

Converting Browser Bookmarks to Dictionaries

The Perl script in Appendix C can be used to convert the "Favorites" folder containing Internet bookmarks for Microsoft Internet Explorer 5 to the dictionary file format described above. The inexpensive utility program LinkSync (http://www.bluesquirrel.com) can be used to convert Netscape Navigator bookmarks to MSIE format (and vice versa). Many "web surfers" have valuable hierarchically organized "link collections" in their browsers which might usefully be converted to dictionary files that can be submitted to the link installation server. Hierarchy is preserved by creating context paths as needed.

REFERENCES CITED

U.S. PATENT DOCUMENTS

U.S. Pat. No. 4,982,344; Jan. 1, 1991; Daniel S. Jordan; Accelerating link creation

OTHER PUBLICATIONS

L. Carr, "The link fifty years on: A personal view of hypertext linking," SIGWEB Newsletter, vol. 8, pp. 41–43, Feb. 1991.

L. Carr, D. De Roure, W. Hall, and G. Hill, "Implementing an open link service for the world-wide web," World Wide Web, vol. 1, no. 2, pp. 61–71, 1998.

S. Hitchcock, "Open journal project: final report to elib," tech. rep., Multimedia Research Group, University of Southampton, November 1998.

H. Wells, "World brain: The idea of a permanent world encyclopedia," in Encyclopedia Francaise, 1937.

7 APPENDICES

7.1 APPENDIX A: PERL SCRIPT FOR LINK INSTALLATION

```perl
#!/usr/bin/perl -w
# Apply w3k dictionary database (.dict) to HTML file (.html)
# EXAMPLE: appdict w3k.dict myfile.html outfile.html
use strict;
my $debug = 0;
my $firstonly = 1;      # 1 = replace only first occurrence, else all
my $uselynx = 0;        # 0 = use second parse pass (doubles all text)
sub usage { die "usage: $0 dictionary.dict .. infile1.html outfile.html\n" }
my $outname = pop or usage;
my $ihname = pop or usage;
my(@keys,@urls,$instring,$err,@keystring);
open(STDOUT, ">$ihname.txt") or die "Can't open text dump file '$ihname.txt'
: $!\n" ;
@ARGV or usage;
my $key = " ";
my $url = " ";
my $wantkey = 1;
my $comments = " ";
my $pass = 1;
print STDERR "infile = $ihname\n";
print STDERR "outfile = $outname\n";
print STDERR "Reading dictionaries '" . join(',',@ARGV) . "' . . . ";
while(<>) {
    if (/ #(.*)/) {
        print STDERR $_ . "\n" if $debug;
        $comments .= ($_ . "\n");
        next;
    }
    if (/^KEY = (.*)/) {
        push(@keys, $1);
#       print "KEY = $key\n";
        $wantkey || die "KEY/URLs out of order at KEY = $key\n";
        $wantkey = 0;
    }
    if (/^URL = (.*)/) {
#       print "URL = $1\n";
        push(@urls, $1);
        !$wantkey || die "KEY/URLs out of order at KEY = $key\n";
        $wantkey = 1;
    }
}
print STDERR "done.\n";

# For each entry in the dictionary, find and replace in the input text.

print STDERR "=== Processing input file /$ihname/\n";
# Note: HTML Entities are decoded only on pass 1.
# If a key phrase contains these things, the pass-2 match will fail.
my (@keymatch,@urlmatch,@begmatch);
package MyFilter;
require HTML::Filter; # See p. 732 of Goodman
@MyFilter::ISA = qw(HTML::Filter);
use HTML::Entities qw(decode_entities encode_entities);
my $pagetext = " ";
my @keydone = 0;
sub text {
    my $self = shift;
    my $text = $_[0];
    if($self->{anchor_seen}) {
        print STDERR "Pass 1: SKIPPING ANCHOR TEXT = '$text'\n" if $debug;
        goto EXIT;
    }
    if($self->{title_seen}) {
        print STDERR "Pass 1: SKIPPING TITLE TEXT = '$text'\n" if $debug;
        goto EXIT;
    }
    if ($text =~ /\w/) {
        if ($pass == 1) {
#           print STDERR "\n\n---Pass 1: Input Text = '$text'\n";
            $pagetext .= (decode_entities($text) . "\n");
        } else {
            print STDERR "\n\nPass 2:---Input Text = '$text'\n" if $debug;
            # convert any obvious email addresses into mailto links
            $text       =~       s{(\b\w+)\@(\w+(\.\w+)+)}{<A HREF="mailto:$1\@$2">$1\@$2</A>}g;
```

-continued

7 APPENDICES

```
            # convert any obvious open-text URLs into links
            $text =~
                    s{\b(http|ftp)://(\w+\S+(\.\w+)+)}{<A
HREF="$1://$2">$1://$2</A>}g;
# test:     goto EXIT;
            print STDERR "\nNew text after basic URLification = '$text'\n\n"
                if $debug;
            my($key, $url);
#           for (my $i=0; $i<@keymatch; $i++) {
#               print STDERR "%*%*% keydone[$i] = '$keydone[$i]'\n";
#           }
            for (my $i=0; $i<@keymatch; $i++) {
                if ($firstonly && $keydone[$i]) {
                    goto NEXT_KEY_2;
                }
                $key = $keymatch[$i];
                print STDERR "keymatch[$i] = '$key'\n" if $debug;
                $url = $urlrnatch[$i];
                my @keywords = split ' ', $key;
                my $sp = "(^|[`\"]>|\\s|\\(|\\[) (" .
                    join('\s+', @keywords) . "s?) (\\b)";
                print STDERR "pass 2 search pattern = '$sp'\n"
                    if $debug;
                my $rtn = 0;
                if ($firstonly) {
                    $rtn = ($text =~ s/$sp/$1<A HREF=\"$url\">$2<\/A>$3/i);
                } else {
                    $rtn = ($text =~ s/$sp/$1<A HREF=\"$url\">$2<\/A>$3/ig);
                }
                if ($rtn) {
                    $keydone[$i] = 1;
                }
                print STDERR "\nNew text = '$text'\n\n" if $debug;
            NEXT_KEY_2:
            } # $i iteration over keymatches
        } # pass 2 block
    } else {
        print STDERR "*** No word chars --- goto EXIT\n" if $debug;
    }
#   $self->SUPER::text(encode_entities($text));
    EXIT:
    $self->SUPER::text($text);
}
# Overrides for suppressing output within anchors <A> ... </A>
sub start
{
    my $self = shift;
    $self->{anchor_seen}++ if $_[0] eq "a";
    $self->{title_seen}++ if $_[0] eq "title";
    $self->SUPER::start(@_);
}
sub end
{
    my $self = shift;
    $self->SUPER::end(@_);
    $self->{anchor_seen}-- if $_[0] eg "a";
    $self->{title_seen}-- if $_[0] eg "title";
}
package main;
# ----------------------- PASS 1 ----------------------------

# First parse the file, concatenating all non-tag HTML text
# into one long string. Then normalize the string to lower case
# with each white-space run reduced to a single space.
# Search the normalized text for each key.
# For each match, store the key and url for pass 2
# unless the current key matches within the previous matched key.
$pass = 1;
if ($uselynx) {
    $pagetext = `lynx -dump $ihname`;
} else {
    MyFilter->new->parse_file($ihname);
}
print STDERR "*** Pass 1 page text = "$pagetext'\n" if $debug;
my $normtext = lc($pagetext); # case insensitive on pass 1
$normtext =~ s/\s+/ /g; # normalize any whitespace to single ' '
print STDERR "\n\n ===================================== \n "
```

-continued

7 APPENDICES

```perl
        if $debug;
#       "Normalized page text = \n'$normtext'\n";
for (my $i=0; $i<@keys; $i++) {
    $key = $keys[$i];
    my $1key = lc($key);
    print STDERR "key = '$key'\n" if $debug;
    next if $key =~ /^#/; # ignore comments
    $url = $urls[$i];
#   print STDERR "url = '$url'\n";
    my @keywords = split ' ', $1key;
    my $sp = " (^|[^\"]>|\s|\\(|\\[) (" .
        join('\s+', @keywords) . "s?) (\\b)";
    print STDERR "pass 1 search pattern = '$sp'\n" if $debug;
    if (! ($normtext =~ s/$sp//g)) {
        # Remove match from string (see appdictNote2.txt)
        print STDERR "*** Key[0] not present --- goto NEXT_KEY_1\n"
            if $debug;
        goto NEXT_KEY_1;
    } else {
        push(@keymatch,$key);
        push(@urlmatch, $url);
        print STDERR "*** Found '$key' in page " .
            "at least once in normtext.\n"
                if $debug;
        print STDERR "keymatch[" .
            (@keymatch-1) . "] = $keymatch[@keymatch-1]\n"
                if $debug;
    }
    NEXT_KEY_1:
}
print STDERR "(*** Pass 1 COMPLETE\n" if $debug;
# ----------------------- PASS 2 ----------------------------
# All matches found.
# Make a second pass to install links.
@keydone = ((0,) x @keymatch);
$pass = 2;
close(STDOUT);
open(STDOUT,, ">$outname")
    or die "Can't open output file '$outname' : $!\n";
MyFilter->new->parse_file($ihname);
# Detect failed matches
# (presumably due to phrase straddling buffers):
for (my $i=0; $i<@keymatch; $i++) {
    $key = $keymatch[$i];
    if (! $keydone[$i] ) {
        print STDERR "*** ASSERTION FAILURE:
            keymatch[$i] = '$key' NEVER USED\n";
    }
}
```

7.2 APPENDIX B: CREATING A DICTIONARY FROM A SET OF HTML FILES.

```perl
#!H:/Local/perl/bin/perl.exe -w
#!/usr/bin/perl5 -w
#!/usr/bin/perl -w
#use lib "/usr/local/lib/perl5/site_perl/5.005";
use strict;
use LWP::Simple;
use HTML::TokeParser;
use DB_File;
sub usage { die "Usage: $0 <URL>\n"; }
my $debug = 0;
my $omitrawdirs = 0; # Set nonzero to inhibit raw directory spidering
my $filename = "getdict.tmp";
my $dbname = "getdict.dbh";
$|=1;
my $URL = shift || usage;
#my $URL = "http://www-ccrma.stanford.edu/~jos/Welcome.html";
#my $URL = "http://localhost/W3K/Welcome.html";
unless (defined (my $content = get($URL)) {
    print STDERR "*** Could not get $URL\n\n";
    exit(1);
} else {
    print "$URL retrieved successfully.\nExtracting links . . .\n\n" if
$debug;
    # FIXME: subclass TokeParser to accept input from $content directly
    open(FILE, ">$filename") or die "Can't open '$filename' for output :
$!\n";
```

-continued

7 APPENDICES

```
        print FILE $content;
        close FILE;
}
my $p = HTML::TokeParser->new($filename)
        || die "Can't open $filename for input: $!";
my $title = "(no title) ";
if ($p->get_tag("title")) {
        $title = $p->get_trimmed_text;
        $title =~ s/^\s*[0-9](\.?[0-9])*\s*//o;   #Rmv leading space, sec num,
etc.
        print              "# $URL\n\nKEY = $title\nURL = $URL\n\n";
        print STDERR "# $URL\n\nKEY = $title\nURL = $URL\n\n";
}
my $urlpfx = $URL;
# remove last '/' and after;
$urlpfx =~ s,(.*) ([^/]*)$,$1,;
print "URL prefix = '$urlpfx'\n\n" if $debug;
my $mainurl = $URL;
# remove FIRST '/' and after;
$mainurl =~ s,http://([^/]*) (/.*),http://$1,;
print "MAIN URL = '$mainurl'\n\n" if $debug;
my @sublinks = ();
tie(my %db, 'DB_File', $dbname) or die "Can't open database '$dbname' :
$!\n";
my $url;
my %oob = ();
while (my $token = $p->get_tag("a")) {
        $url = $token->[1]{href} || "";
        print STDERR "Found ANCHOR URL = $url\n\n" if $debug;
        my $fc = substr($url,0,1);
        if ($fc eq '?') {
                print STDERR "OMITTING '$url '\n" if $debug;
                next;
        }
        my $nosec = $url;
        my $havesec = ($nosec =~ s/(#[^#]+)$//o);
        if ($havesec) {
                print STDERR "NOT SPIDERING REFERENCE WITHIN HTML FILE '$url'\n"
                        if $debug;
                $oob{$url} = $text; # treat these like out-of-website references
                next;
        }
        if ($url =~ /^\.\//) {
                print STDERR "Absolutifying '$url'\n" if $debug;
                $url = "$urlpfx/" . (substr $url, 2); # Relative URL
        }
        if ($url =~ m{^/}) {
                print STDERR "Absolutifying '$url'\n" if $debug;
                $url = $mainurl . $url; # Absolute URL at site
        }
        if ($url =~ /^\.\.\//) {
                print STDERR "OMITTING UPSTAIRS PATH '$url'\n" if $debug;
                next;
        }
        if ( ! ($url =~ /(http\:|file\:|ftp\:|mailto\:)/i)) {
                print STDERR "Absolutifying '$url'\n" if $debug;
                $url = "$urlpfx/$url"; # Assume relative URL
        }
        my $lfc = substr($url,length($nosec)-4,4);
        my $text = $p->get_trimmed_text("/a");
        $text =~ s/^\s*[0-9] (\.?[0-9])*\s*//o; # Rmv leading space, sec num,
etc.
        if (($lfc ne '.htm') && $lfc ne 'html') ( # Appears not to be HTML
                if ($omitrawdirs) {
                        print STDERR "OMITTING NON-HTML FILE '$url'\n" if ($debug);
                        next;
                }
                if ( ! ($url =~ m/\./) ) { # Directory name?
                        my $lc = substr($url,length($url)-1,1);
                        chop($url) if ($lc eq '/');
                        my $newurl = $url . '/index.html';
                                print STDERR "APPARENT DIRECTORY '$url' REWRITTEN AS
'$newurl'\n";
                        $url = $newurl;
                } else {
                        print STDERR "OMITTING NON-HTML FILE. AND APPARENT NON-DIRECTORY
                                '$url'\n" if $debug;
```

```perl
            next;
        }
    }
    my $lctext = lc($text);
    if ( ($text =~ /^\.\.\./)
        || ($text =~ /\b19[0-9] [0-9]/) # plain year (citation)
        || ($text =~ /^[0-9\.]+$/) # bare number (12h)
        || ($text =~ /^File:/) # local file URL
        || ($text =~ /\/\.\.\//) # filename contains '/../'
        || ($text =~ m{(\b\w+)\@(\w+(\.\w+)+)}) # email address
        || ($text eq "up") # navigation (12h)
        || ($text eq "next")
        || ($text eq " ")
        || ($text eq "previous")
        || ($url =~ m!/-!))
    {
        print STDERR "OMITTING:\n\tKEY = $text\n\tURL = $url\n\n";
        next;
    }
    if ( ($lctext eq "introduction")
        || ($lctext eq "contents")
        || ($lctext eq "conclusions")
        || ($lctext eq "bibliography")
        || ($lctext eq "general information")
        || ($lctext eq "administrative information")
        || ($lctext eq "lectures"))
    {
        print STDERR "OMITTING:\n\tKEY = $text\n\tURL = $url\n" .
            "but really we could PREFIX this one.\n\";
        next;
    }
    if (exists $db{$url} ) {
        print STDERR "(NOT SPIDERING --- CYCLE DETECTED)\n" if $debug;
        next;
    }
    my $slpfx = $url;
    $slpfx =~ s,(.*) (/[^/]*)$,$1,;
    print STDERR "Sublink prefix = '$urlpfx'\n\n" if $debug;
    if (substr($slpfx, 0, length($urlpfx)) eq $urlpfx) {
        push(@sublinks, $url);
        print STDERR "SPIDERING $url\n" if $debug;
        $db{$url} = $text;
        # Note: Each spidered URL is printed out twice,
        # first with KEY = <href text>,
        # then with KEY = <title text>
        # This usually produces two different keys for the URL.
        print "KEY = $text\nURL = $url\n\n";
        print STDERR "KEY = $text\nURL = $url\n\n";
    } else {
        print "NOT SPIDERING $url (OUT OF BOUNDS)\n" if $debug;
        $oob{$url} = $text;
        # save printout for very end to collect these together
    }
}
if ($debug) {
    if (@sublinks) {
        print STDERR "\nSUBLINKS FOUND IN $URL:\n";
        foreach my $link (@sublinks) {
            print STDERR "$link\n";
        }
    } else {
        print STDERR "\nNO SUBLINKS FOUND IN $URL\n";
    }
}
untie %db; # close "seen" file before recursing
my @badlinks = ();
foreach my $link (@sublinks) {
    print STDERR "\nSpidering $link . . . \n" if $debug;
    if (system("$0 $link") != 0) {
        push (@badlinks,$link);
        print STDERR "*** system(\"$0 $link\") failed\n" if $debug;
    }
    sleep(1); # don't pummel the server
}
print "\n==== FINISHED PROCESSING $URL ===\n" if $debug;
if (@badlinks) {
    tie(my %db, 'DB_File', $dbname)
```

7 APPENDICES

```
            or die "Can't open database '$dbname' : $!\n";
        foreach my $link (@badlinks) {
            delete $db{$link};
            print STDERR "BAD LINK $link DELETED\n";
        }
    }
    if (%oob) {
        print          "# REMOTE OR INTRA-FILE LINKS (NOT SPIDERED):\n\n";
        print STDERR   "# REMOTE OR INTRA-FILE LINKS (NOT SPIDERED):\n\n";
        foreach $url (sort keys %oob) {
            print           "KEY = $oob{$url}\nURL = $url\n\n";
            print STDERR    "KEY = $oob{$url}\nURL = $url\n\n";
        }
    }
}
```

7.3 APPENDIX C: CREATING A DICTIONARY FROM AN INTERNET EXPLORER "FAVORITES" FOLDER.

```perl
#!/usr/bin/perl
# This file is ie5links
# USAGE: In a shell,
# find FavoritesDir -name "*.url" -exec ie5links {} \; >> ie5f.dict
# Extract all links from an ASCII text file to w3k dictionary format.
use Cwd;
$wd = getcwd();
$path = $wd . '/' . $filename;
@path = split /\//, $path;
$file = pop @path;
$curdir = pop @path;
$dotdot = join '/', @path;
$dot = $dotdot . '/' . $curdir;
$urls = '(http|telnet|gopher|file|wais|ftp)';
$ltrs = '\w';
$gunk = '/#~:.?+=&%@\-';
$punc = '.:?\-';
$any = "${ltrs}${gunk}${punc}";
while (<>) {
    if (/\b ( $urls : [$any]+? ) (?=[$punc]* [^$any] | $)/igox) {
        $url = $1;
    }
    next unless $url;
    $text = ($dot . '/' . ($filename = $ARGV));
    $text =~ s/\.url$//;
    print "KEY = $text\n";
    print "URL = $url\n\n";
}
```

7.4 APPENDIX D: PERL SCRIPT ILLUSTRATING COMPUTATION OF EDUCATIONAL LEVELS

```perl
#!H:/Local/perl/bin/perl.exe -w
use strict;
use node;
my $debug = 0;
my $N = 5; # Number of nodes to test with
# Instantiate nodes:
my @nodes = (0) x $N;
for (my $i = 0; $i<$N; $i++) {
    my $node = ($nodes[$i] = Node->new($i));
}
# Wire up a test example:
$nodes[4]->refs([$nodes[3],$nodes[2]]);
$nodes[3]->refs([$nodes[2],$nodes[1]]);
$nodes[2]->refs([$nodes[1]]);
$nodes[1]->refs([$nodes[0]]);
# Gives a cycle to self: $nodes[0]->refs([$nodes[0]]);
# Gives a long cycle: $nodes[0]->refs([$nodes[4]]);
# For renormalization test:
my $minNormalizedLevel =    1; # Must be > 0
my $maxNormalizedLevel = 100; # Must be > minNormalizedLevel
*$nodes[0] ->manlevel(8);
$nodes[1] ->manlevel (12);
#$nodes [4] ->manlevel (20)
# The code below requires the following data structures to be set up:

# @nodes    = length N array of references to all definition-node objects
#             in arbitrary (lexical) order.

# Each reference points to a "node object" data structure containing
```

7 APPENDICES

```

# $num       = lexical ordering number (between 1 and N).
# $opened    = set nonzero during level computation recursion
#                   (for detecting cycles in the graph)
# $key       = key-phrase representing this word or synonym group
# $url       = definition URL for this node's key-phrase
# $level     = Automatically computed level, initialized to zero.
# $manlevel  = manually set level. Zero means no manually set level.
# @refs      = array of referenced nodes (0 means none).
#              ANY FORWARD REFERENCES SHOULD NOT BE INCLUDED IN THIS LIST.
if ($debug) { # Print out the test case topology
    for (my $j = 0; $j<$N; $j++) {
        my $node = $nodes[$j];
        print STDERR "Node $j refs " .
            ($node->refs ?
            join(", ", map { $_->num if defined $_} @{$node->refs}) :
            "<no refs>") . "\n";
    }
}
# For each node, assigning its level recursively:
for (my $i=0; $i<$N; $i++) {
# Alter cycle-breaking results: for (my $i=$N-1; *$i >= 0; $i--) {
    my $level = 0;
    print STDERR * \n*** ASSIGN LEVEL TO NODE $i ***\n" if $debug;
    $level = assignLevel($nodes[$i]);
    print STDERR "assignLevel(top) returned $level\n" if $debug;
}
print STDERR "\nRaw level output:\n";
for (my $i = 0; $i<$N; $i++) {
    my $node = $nodes[$i];
    print STDERR "D$i(" . $node->level . ") references " .
        ($node->refs ?
        join(",", map { "D" . $_->num . "(" . $_->level . ")" }
            @{$node->refs}) :
        "<no refs>") . "\n";
}
# Normalize levels:
my @lmap1 = (0) x $N; # Map abscissae
my @lmap2 = (0) x $N; # Map ordinates
# Find min and max raw levels and their indices:
my $minl = 100;
my $maxl = 0;
my $minll = -1;
my $maxll = -1;
for (my $i = 0; $i<$N; $i++) {
    my $node = $nodes[$i];
    $lmap1[$i] = (my $1 = $node->level);
    if ($1 > $maxl) {
        $maxl = $1;
        $maxll = $i;
    }
    if ($1 < $minl) {
        $minl = $1;
        $minll = $i;
    }
}
# Install default min and max normalized levels
# at raw-level extremes:
if (! $nodes[$minll]->manlevel ) {
    $nodes[$minll]->manlevel($minNormalizedLevel);
}
if (! $nodes[$maxll]->manlevel ) {
$nodes [$maxll]->manlevel ($maxNormalizedLevel);
}
# The following array is only used to print out the map:
my @normLevel = (0) x ($maxl+1); # index = raw level
# Find all "breakpoints" in the piecewise-linear level map
my $nbp=0; # number of breakpoints
my @bpl; # raw level at each breakpoint
my @bpv; # normalized level at each breakpoint
my %bpvh; # normalized level as a fn of raw level
for (my $i = 0; $i<$N; $i++) {
    my $node = $nodes[$i];
    $lmap2[$i] = (my $ml = $node->manlevel);
    if ($ml > 0) { # manual assignment exists => breakpoint here
        print STDERR "Manual level exists for node $i = $ml\n" if $debug;
        $bpl[$nbp] = $node->level;
```

-continued

7 APPENDICES

```perl
            $bpv[$nbp++] = $ml; # for convenience
            $bpvh{$node->level} = $ml; # used for sorting by raw level
        }
    }
    if ($debug) {
        print STDERR "Raw map, node-by-node:\n";
        for (my $i = 0; $i<$N; $i++) {
            print STDERR "$lmap1[$i] -> $lmap2[$i]\n";
        }
        # Print unsorted breakpoints:
        print STDERR "\nMap breakpoints:\n";
        for (my $i = 0; $i<$nbp; $i++) {
            print STDERR "Raw level $bpl[$i] is pinned to " .
                "normalized level $bpv[$i]\n";
        }
    }
    # Sort breakpoints
    my $i=0;
    print STDERR "\nSORTED map breakpoints:\n" if $debug;
    foreach my $l (sort { $a <=> $b } keys %bpvh) {
        $bpl[$i] = $l;
        $bpv[$i] = $bpvh{$l};
        print STDERR "Raw level $bpl[$i] is pinned to normalized level
$bpv[$i] \n"
            if $debug;
        $i++;
    }
    # traverse nodes applying map (also save map for printing):
    for (my $i = 0; $i<$N; $i++) {
        my $node = $nodes[$i];
        my $l = $node->level;
        my $v = $node->manlevel;
        if ($v > 0) {
            $normLevel[$l] = $v; # for checking only
            next;
        }
        my $bp1l = 0; # index of upper breakpoint
        while ($bpl[$bp1l] <$l) { $bp1l++ }
        my $v0 = $bpv[$bp1l-1]; # bp to the left
        my $v1 = $bpv[$bp1l];  # bp to the right
        my $l0 = $bpl[$bp1l-1]; # distance to the left
        my $l1 = $bpl[$bp1l]; # distance to the right
        print STDERR "\nSetting manual level for node $i (raw level $l) to " .
            "bp1l = $bp1l, v0 = $v0, v1 = $v1, l0 = $l0, l1 = $l1\n" if $debug;
        die # l0 cannot equal l1\n" if ($l0 == $l1);
        my $slope = ($v1 - $v0) / ($l1 - $l0) ;
        my $dist = $l - $l0;
        $v = $v0 + $slope * $dist;
        print STDERR "slope = $slope, dist = $dist, v = $v\n" if $debug;
        $node->manlevel($v); # commit to normalized level
        $normLevel[$l] = $v; # for checking only
    }
    # print map for all raw levels seen:
    print STDERR "\nSaved level map:\n";
    for (my $i = $minl; $i<=$maxl; $i++) {
        print STDERR "Raw level $i -> normalized level $normLevel[$i]\n";
    }
    print STDERR "\nNormalized level output:\n";
    for (my $i = C; $i<$N; $i++) {
        my $node = $nodes[$i];
        print STDERR "D$i(" . $node->manlevel . ") references " .
            ($node->refs ?
                join(",", map { "D" . $_->num . "(" $_->manlevel . ")" }
                    @{$node->refs}) ;
                "<no refs>") . "\n";
    }
}
# ------------------------- Utilities -------------------------
# this routine assigns raw levels:
sub assignLevel { # (nodeObject)
    my $node = shift; # reference to a node object in the tree
    my $num = $node->num;
    my $level = $node->level;
    if ($debug) {
        if ($level > 0) {
                    print STDERR "Node $num already set to level $level.
Returning.\n";
        } else {
```

7 APPENDICES

```perl
            print STDERR "Computing level of node $num.\n";
        }
    }
    return $level if ($level > 0); # level exists => this node already seen
    if ($node->opened) { # cycle
        my $key = $node->key;
        my $url = $node->url;
        print STDERR "CYCLE DETECTED!\n" .
            "Attempt to reference node $num while computing its level:\n" .
                "\tKEY = $key\n" .
                    "\tURL = $url\n";
        return -1; * Signal cycle one level up in recursion
    }
    if ($node->refs == 0) { # no w3k references
        printf STDERR "Node " . $node->num . " has no refs\n" if $debug;
        $node->level(1); # Either no refs or all outside refs
        return 1;
    }
    print STDERR "Checking refs of Node " . $node->num . " = " .
        join(", ", map { $_->num} @{$node->refs}) . "\n" if $debug;
    my $maxRefLevel = 0;
    my $refLevel = 0;
    for (my $j=0; $j < @{$node->refs}; $j++) { # traverse references
        my $ref = $node->refs->[$j];
        print STDERR "Checking ref " . $ref->num . "\n" if $debug;
        $node->opened(1); # for cycle detection
        $refLevel = assignLevel($ref);
        $node->opened(0);
        if ($refLevel < 0) { # cycle found
            my $rkey = $ref->key;
            my $rurl = $ref->url;
            my $key = $node->key;
            my $url = $node->url;
            print STDERR "\tParent Node = node &num:\n";
            print STDERR "\tKEY = $key\n\tURL = $url\n";
            my $discussion = qq|
If nodes are traversed at the top level from most advanced to least
advanced (at least approximately), then this cycle-breaking algorithm
will tend to break forward references at elementary levels, which is
preferred. To break it differently, you can visit top-level nodes in
the opposite order. However, all cycles should ultimately be broken
manually by marking forward references as such in the source text.
|;
            print STDERR "\nIGNORING REFERENCE TO NODE " . $ref->num .
                " WITHIN NODE $num TO BREAK CYCLE\n" .
                    $discussion . "\n" ;
        }
        if ($refLevel > $maxRefLevel) {
            $maxRefLevel = $refLevel;
        }
    }
    $node->level($maxRefLevel + 1);
}
# =============== BEGIN FILE node.pm ================
# -*-Perl-*-
# Simple "node" object
package Node;
require 5.000;
use English;
use Carp;
use strict;
use vars qw(@EXPORT $VERSION);
$VERSION = "5.01";
require Exporter;
*import = \&Exporter::import;
@EXPORT = qw(node);
# Easy to use constructor
sub node ($,$) { NODE->new(@_); }
sub new
{
    my $class = shift;
    my $self = { };
    my $num = undef;
    bless($self, $class);
    if (@_) {
        $num = shift;
        $self->{NUM} = $num;
```

-continued

7 APPENDICES

```
    };
    $self->{OPENED} = 0;
    if (defined $num) {
        $self->{KEY} = "KEY for node $num";
        $self->{URL} = "URL for node $num";
    } else {
        $self->{KEY} = "KEY for some node";
        $self->{URL} = URL for some node";
    }
    $self->{LEVEL} = 0;
    $self->{MANLEVEL} = 0;
    $self->{REFS} = 0;
    return $self;
}
sub num
{
    my $self = shift;
    if (@_) { $self->{NUM} = shift };
    return $self->{NUM};
}
sub opened
{
    my self = shift;
    if (@_) { $self->{OPENED} = shift };
    return $self->{OPENED};
}
sub key
{
    my $self = shift;
    if (@_) { $self->{KEY} = shift };
    return $self->{KEY};
}
sub url
{
    my $self = shift;
    if (@_) { $self->{URL} = shift };
    return $self->{URL};
}
sub level
{
    my $self = shift;
    if (@_) { $self->{LEVEL} = shift };
    return $self->{LEVEL};
}
sub manlevel
{
    my $self = shift;
    if (@_) { $self->{MANLEVEL} = shift };
    return $self->{MANLEVEL};
}
sub refs
{
    my $self = shift;
    if (@_) { $self->{REFS} = shift };
    return $self->{REFS};
}
1;
# END OF FILE node.pm
```

What is claimed is:

1. A system for organizing competing explanatory information, the system comprising:

hierarchical database means, including hierarchically organized nodes of information;

key-phrase association means, wherein a node of said hierarchical database is associated with a set of one or more key phrases, wherein the key phrases in the set of key phrases share a substantially common meaning;

competing definitions means, wherein a plurality of competing definitions is associated with said set of key phrases, wherein each said competing definition substantially explains the common meaning shared by the key phrases;

property association means, wherein the property association means associates two or more of the plurality of competing definitions with two or more definition properties to produce a set of associated definition properties, wherein at least one of said definition properties is selected from the group consisting of educational level, language, rating, viewer suitability, resource type, context, number of hits, number of installs, and date;

rank-ordering means, wherein the rank ordering means rank orders the plurality of competing definitions based on at least one of said associated definition properties.

2. The system of claim 1, further comprising search means for specifying a subset of said information in said hierarchical database by means of a keyword-based search;

output means for returning said information subset as a search result.

3. The system of claim 2, wherein said search means further comprises means for specifying a subset of said information in said hierarchical database based on an assigned context for said information.

4. The system of claim 2, wherein said search means further comprises means for specifying a subset of said information in said hierarchical database based on at least one of said definition properties.

5. The system of claim 4, wherein at least two of said associated definition properties correspond to a rating.

6. The system of claim 4, wherein at least one of said associated definition properties corresponds to an owner.

7. The system of claim 1, further comprising browsing means supporting navigation within said hierarchical database;

output means for returning information corresponding to a current position within said hierarchical database.

8. The system of claim 7, further comprising node selection means based on assigned contexts, and wherein said output means returns information in accordance with said node selection.

9. The system of claim 7, further comprising definition selection means, wherein said competing definitions are selected based on at least one of said associated definition properties, and wherein said output means returns information in accordance with said definition selection.

10. The system of claim 1, wherein at least two of said associated definition properties correspond to a rating.

11. The system of claim 1, wherein at least two of said associated definition properties correspond to an education level.

12. The system of claim 1, wherein paths to nodes of said hierarchical database correspond to semantic contexts.

13. The system of claim 12, further comprising input means for specifying a set of one or more input key phrases;

ordered search means for searching said semantic contexts in a predetermined order for occurrences of key phrases in said set of input key phrases associated with said nodes of information;

search retrieval means for returning one or more competing definitions from said nodes of information associated with said set of input key phrases.

14. The system of claim 13, wherein said ordered search means further includes means for using a semantic context to limit said searching to a subset of said nodes of information.

15. The system of claim 13, wherein the search retrieval means further includes means for returning one or more competing definitions based on a property list of at least one of said competing definitions.

16. The system of claim 13, wherein the search retrieval means further includes means for returning one or more competing definitions based on an order in which the contexts are ordered by said ordered search means.

17. The system of claim 13, further comprising link installation means for automatically linking one or more occurrences in a document of an input key phrase to one or more of said competing definitions returned by said search retrieval means.

18. The system of claim 13, wherein the ordered search means terminates upon a first occurrence of a matching key phrase matching any of said input key phrases.

19. The system of claim 18, wherein the search retrieval means returns one or more competing definitions ordered according to one or more properties of said property list.

20. The system of claim 18, wherein the search retrieval means returns a highest ranked competing definition for the matching key phrase.

21. The system of claim 20, further comprising link installation means, wherein one or more occurrences in a document of an input key phrase is automatically linked based on the highest ranked competing definitions for the matching key phrase.

22. A computer-implemented method for providing a database of competing definitions, the method comprising:

a) storing in a database a hierarchically organized set of nodes;

b) associating with a node in the hierarchically organized set of nodes a set of one or more key phrases, wherein the key phrases in the set of key phrases share a substantially common meaning;

c) receiving and storing a plurality of competing definitions for the node, wherein each of the competing definitions provides a different explanation of the substantially common meaning shared by the key phrases associated with the node;

d) associating properties with the competing definitions to produce a set of associated definition properties, wherein said wherein at least one of said properties is selected from the group consisting of educational level, language, rating, viewer suitability, resource type, context, number of hits, number of installs, and date; and e) rank ordering the competing definitions using at least one of the associated definition properties.

23. The method of claim 22, wherein said property list includes a property corresponding to an educational level.

24. The method of claim 22, wherein said property list includes a property corresponding to a rating.

25. The method of claim 22, wherein paths to nodes in the hierarchically organized set of nodes correspond to semantic contexts.

26. The method of claim 25, further comprising:

receiving input key phrases;

searching the database nodes in a predetermined order for occurrences of the input key phrases in matching database nodes;

retrieving one or more competing definitions from the matching database nodes.

27. The method of claim 26, wherein the searching is limited based on a semantic context to a subset of said database nodes.

28. The method of claim 26, wherein the retrieving comprises using one or more properties in the property list associated with the competing definitions in the matching database nodes.

29. The method of claim 26, wherein the searching terminates upon a first occurrence of a matching key phrase matching any of said input key phrases.

30. The method of claim 29, further including linking one or more occurrences of an input key phrase in a document based on the retrieved competing definitions.

31. The method of claim 29, wherein the step of retrieving returns a highest ranked competing definition for the matching key phrase.

32. The method of claim 31, further including linking one or more occurrences of an input key phrase in a document to the highest ranked competing definition for the matching key phrase.

* * * * *